United States Patent [19]
Morioka et al.

[11] Patent Number: 5,539,562
[45] Date of Patent: Jul. 23, 1996

[54] SPATIAL OPTICAL TRANSMISSION APPARATUS AND METHOD

[75] Inventors: Tatsuya Morioka, Tenri; Mototaka Taneya; Hidenori Kawanishi, both of Nara; Atsushi Shimonaka, Ikoma-gun, all of Japan

[73] Assignee: Sharp Kabushiki Kaisha, Osaka, Japan

[21] Appl. No.: 301,963

[22] Filed: Sep. 7, 1994

[30] Foreign Application Priority Data

Sep. 8, 1993 [JP] Japan .................................. 5-223691
Apr. 5, 1994 [JP] Japan .................................. 6-067476
Jul. 27, 1994 [JP] Japan .................................. 6-175780

[51] Int. Cl.$^6$ .................................................. H04B 10/00
[52] U.S. Cl. ........................... 359/159; 359/162; 359/191
[58] Field of Search ..................................... 359/159, 162, 359/168–170, 172, 191, 182–183, 193

[56] References Cited

U.S. PATENT DOCUMENTS

| 3,875,399 | 4/1975 | Teich | 359/162 |
| 3,970,839 | 7/1976 | Javan | 359/162 |
| 4,305,666 | 12/1981 | Becherer et al. | 359/3 |
| 4,723,310 | 2/1988 | De Corlieu et al. | 359/158 |
| 4,903,341 | 2/1990 | Rice | 359/191 |
| 4,913,547 | 4/1990 | Moran | 356/349 |

FOREIGN PATENT DOCUMENTS

| 0142427 | 5/1985 | European Pat. Off. . |
| 0246004 | 11/1987 | European Pat. Off. . |
| 0482472A2 | 10/1991 | European Pat. Off. . |
| 0235102 | 11/1985 | Japan . |
| 64-39139 | 2/1989 | Japan . |
| WO91/05414 | 4/1991 | WIPO . |

OTHER PUBLICATIONS

Lambert et al, "Short–Range Multi–Terminal Satellite Crosslink Communications", Milcom 92, Conference Record, vol. 3, Oct. 1992, San Diego, pp. 1170–1174.

Chen et al, "Monolithic Integration of an AlGaAs/GaAs Surface Emitting Laser Diode and a Photodetector", Applied Physics Letters, vol. 59, No. 27, 30 Dec. 1991, New York, US, pp. 3592–3594.

Patent Abstracts of Japan, vol. 15, No. 470 (E–1139) 1991 & JP–A–03–203268 (Toshiba).

Harada et al, "A Study of Beam Tracking Schemes Robust to Optical Background Noise in Optical Intersatellite Links (ISLs)", IEICE Technical Report, Sep. 28, 1989.

Oikawa et al, Applied Optics, vol. 21, No. 6, pp. 1052–1056, Mar. 15, 1982, "Distributed–Index Planar Micolens".

Morimoto et al, Japanese Laid–Open Patent Publication No. 64–39139, Laid open on Feb. 9, 1989 with partial English translation.

Sasaki, Japanese Laid–Open Patent Publication No. 3–57987, Laid Open on Mar. 13, 1991 with partial English translation.

(List continued on next page.)

*Primary Examiner*—Leo Boudreau
*Assistant Examiner*—Kinfe-Michael Negash
*Attorney, Agent, or Firm*—Nixon & Vanderhye

[57] ABSTRACT

A spatial optical transmission apparatus includes: a light signal transmitting device for generating a signal beam which is modulated in accordance with a signal to be transmitted and is intensity-modulated with a lower frequency compared with a signal transmission speed; and a light signal demodulating device for receiving the signal beam from the light signal transmitting device by a detector, adjusting the direction of a locally oscillated beam based on the received signal beam so as to have a predetermined relationship with the direction of the signal beam so that intensity-modulated components in an output signal from the detector falls within a predetermined range of intensity, thereby aligning the wavefront of the signal beam with the wavefront of the locally oscillated beam, and extracting signal components which correspond to the transmitted signal from signal components modulated in accordance with the transmitted signal in the signal beam.

9 Claims, 22 Drawing Sheets

OTHER PUBLICATIONS

Inaba, "Proceedings of General Symposium on Study for Important Field of Ultra-Highspeed, Ultra-Parallel, Optical Electronics", vol. 2-S, pp. 49-52, Oct. 16, 1992, Basic Studies on Optical Computed Tomography Using Coherent Detection Imaging Scheme.

Patent Abstracts of Japan, vol. 17, No. 518 (E-1434) 1993 & JP-A-05 136 740 (Canon) 1 Jun. 1993.

Chan "Intersatellite Optical Heterodyne Communication Systems", SPIE vol 1131, Optical Space Communication, Apr. 1989, Paris, FR, pp. 204-215.

FIG. 7
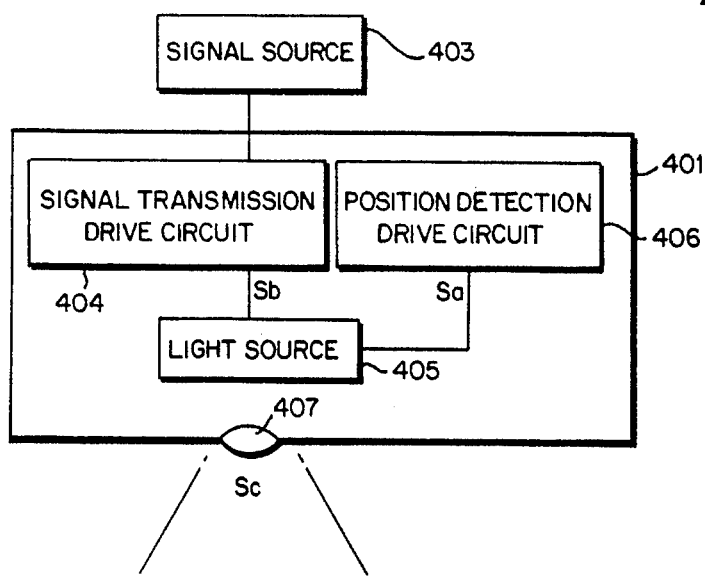
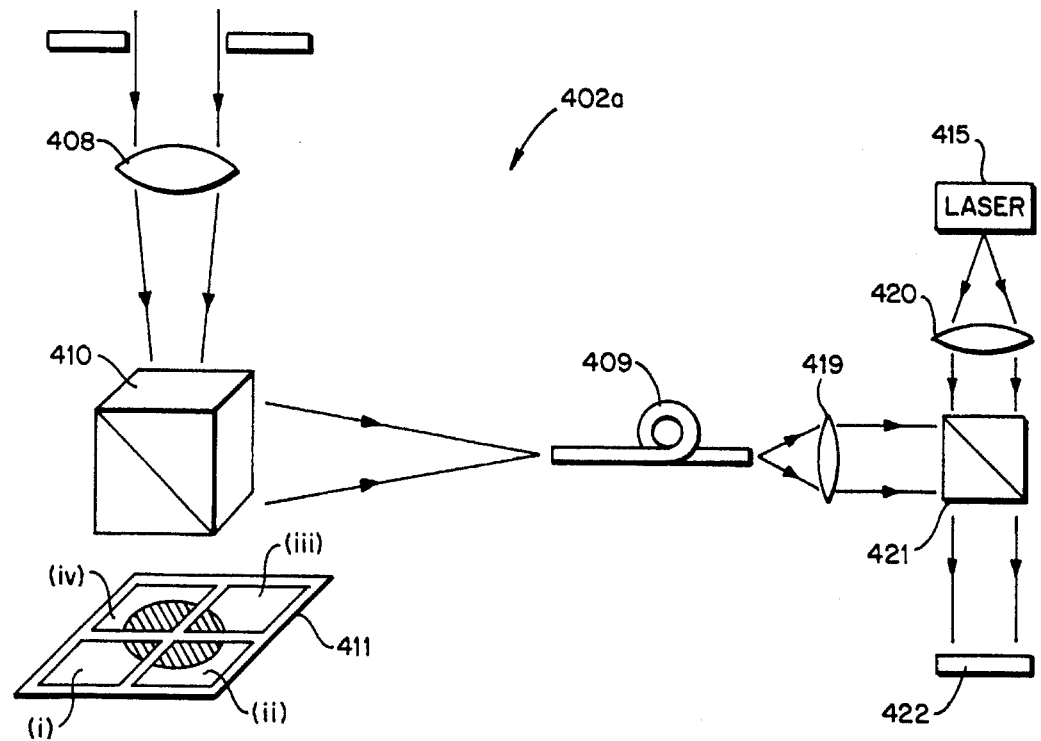

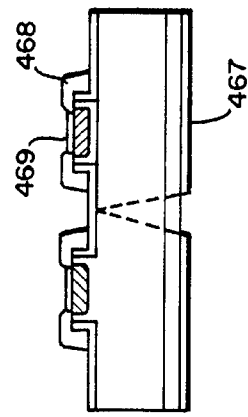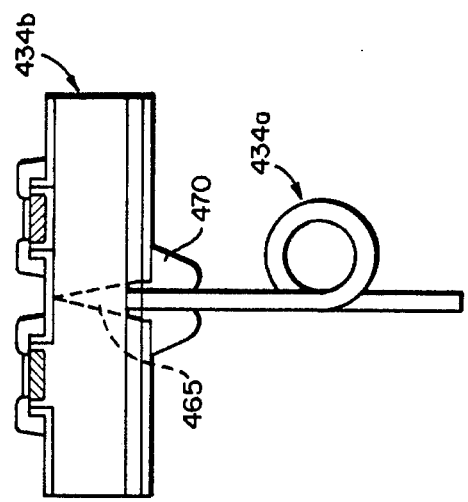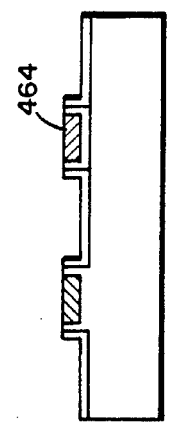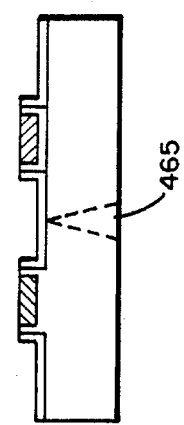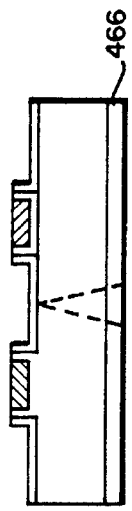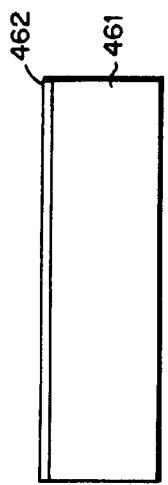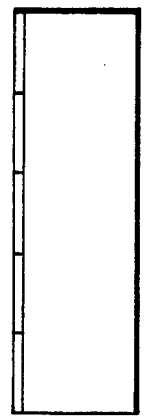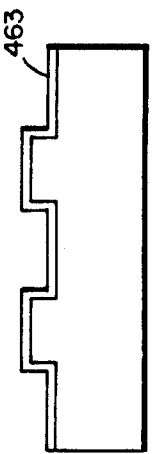

SPATIAL OPTICAL TRANSMISSION APPARATUS AND METHOD

BACKGROUND OF THE INVENTION

1. Field of the Invention

The present invention relates to a spatial optical transmission apparatus for transmitting a light beam in space, and in particular to a spatial optical transmission apparatus and a spatial optical transmission method for performing a spatial optical transmission by utilizing the coherency of a laser beam.

2. Description of the Related Art

Conventionally, by means of optical hetero-dyne wavedetection, a spatial optical transmitting method utilizing the coherency of a laser beam (hereinafter, referred to as an optical heterodyne detection transmission method) has provided a transmission at a high S/N ratio (signal to noise ratio) compared with that provided by a spatial optical transmitting method based on light intensity modulation and direct wavedetection (hereinafter, referred to as an optical direct detection transmission method). In addition, the optical heterodyne transmission detection method is characteristically less affected by incoherent light (background light) existing in the natural world. Thus, when using this method, a transmission at a transmission speed of e.g., 10 Mbps (10 megabits per second) can be performed with a minimum receiving light power equal to or less than about one-eighth of that in the case of the optical direct detection transmission method. This assures long-distance and high-speed transmissions at approximately 10 Mbps, which is a transmission speed required for transmission of a digital moving image or the like but difficult to realize by the optical direct detection transmission method.

Referring to FIG. 22, a line $P_{Od}$ shows the relationship between the transmission speed and the transmission distance which are obtainable at a given receiving light power by an optical direct detection transmission method. A line $P_{Oc}$ shows the relationship between the transmission speed and the transmission distance which are obtainable at a given receiving. light power (equal to the given receiving light power in the optical direct detection transmission method) by a coherent detection method. As is seen from FIG. 22, at a transmission speed of 10 Mbps, the transmission distance can be extended to a point where the receiving light power is about one-eighth as large as that obtained in the optical direct detection transmission method.

In the above-mentioned manner, when a receiving light power is constant, the relationship between the transmission distance and the transmission speed is defined by the product of the transmission distance and the transmission speed. As the receiving light power. becomes larger, the transmission distance and the transmission speed can be increased.

One configuration of an optical heterodyne detection transmission method will be described. A transmission signal beam source is optically frequency-modulated by two kinds of frequencies ($f_1$, $f_2$) in accordance with a signal to be sent (hereinafter, referred to as a transmission signal) like (0, 1) to generate the signal beam into the air. The output signal beam is mixed with a locally oscillated beam (frequency $f_1$) by a signal demodulating device, to be detected by a detector. A signal having only a DC component which corresponds to data 0 and a beat signal of a frequency ($f_2-f_1$) which corresponds to data 1 are obtained from an output signal of the detector. The data can be demodulated from the DC component and the beat signal.

The conventional optical heterodyne detection transmission method has a problem that, in order to demodulate the signal by a wavedetector in a signal demodulating device, an angular difference between the wavefront of a signal beam output from a signal transmitting device located at a spatially arbitrary position and that of a locally oscillated beam in the signal demodulating device should be adjusted to be within 0.01°.

As a spatial optical transmission apparatus described above, a configuration as shown in FIG. 23 has been proposed by Japanese Patent Application No. 4-349403. In the proposed apparatus, a signal transmitting device located at an arbitrary position and a signal demodulating device 2 are apart from each other with a sufficient distance therebetween. Furthermore, the signal demodulating device 2 has an aperture for limiting an area through which a beam enters. Accordingly, on a light receiving face of a wavedetector 7, a transmission signal beam becomes a plane wave. A locally oscillated beam from a locally oscillated beam source 4 provided in the signal demodulating device 2 is collimated by a lens 5. The collimated beam is diffused into spherical waves by such a means as a microlens array 6 to be mixed with the transmission signal beam by an optical multiplexer 3. Herein, the locally oscillated beam has plane wave components in any of the unit areas on the light receiving face of the wavedetector 7. Accordingly, among the wavefronts of the spherical waves exists a wavefront which can be aligned (synchronized) with that of the transmission signal beam propagated from an arbitrary direction, and thus, the transmission signal can be detected.

As another wavefront alignment technique, there has been known a spatial optical transmission between space satellites. As shown in FIG. 24, a beacon light beam 12, which is intensity-modulated as a countermeasure against background light, is transmitted from a beacon light source 11 of the satellite on the signal transmitting side. On the other hand, a signal transmission light source 15, driven by a laser power source 13, generates a signal beam modulated by a modulating device 14 in accordance with a transmission signal. The signal beam is collimated by a lens 16, and output in the space via a precisely directing control mirror 17 and a roughly directing control mirror 18.

In a satellite on the signal receiving side, an output signal of a two-dimensional CCD (charge coupling device) 19 provided for capturing the signal beam is input to a capturing/tracking control circuit 20. A mirror drive device 21 is driven by this capturing/tracking control circuit 20 so as to control the roughly directing control mirror 18, whereby an incident beam is roughly adjusted and input to a four quadrant detector 22. Thereafter, the precisely directing mirror 17 is controlled by the capturing/tracking control circuit 20 based on an output from the four quadrant detector 22, for performing tracking of the signal beam. Then, the received signal beam is received by a signal transmission light receiving element 23. Thereafter, the signal is demodulated in a demodulation circuit 25 via an amplifier 24.

At the time of receiving the signal beam, a superior S/N ratio is obtained by making the spot size of the locally oscillated beam small. However, it is difficult to perform wavefront alignment for a beam with a small spot. For this reason, the wavefront aligning method making a locally oscillated beam diffuse has been used. In this case, however, there occurs a problem that the intensity of the locally oscillated beam is weakened by diffusion.

With reference to FIGS. 25A and 25B, an exemplary configuration of a system using this method will be described. A signal demodulating device 32 is located at a point apart from a portion just below a signal transmitting device 31 by a radius L2 (e.g., 20 m), with a distance L1 (e.g., 5 m) in the vertical direction between the plane on which the signal transmitting device 31 is located and the plane on which the signal demodulating device 32 is located. The size of a signal beam receiving aperture 33 of the signal demodulating device 32 is 0.5 cm×0.5 cm. An optical multiplexer 35 for mixing the locally oscillated beam from a locally oscillated beam source 34 and the signal beam is apart from a photodetector 36 by a distance L3 (e.g., 10 cm). In such a configuration, the intensity of the signal beam is 1/100 as compared with the intensity obtained by a structure which does not employ diffusion of the locally oscillated beam. This results in reduction of the intensity of the locally oscillated beam, which intensity would be sufficiently obtained by conventional techniques. Thus, the above-mentioned method has a problem that a high-speed transmission, which is an advantage of the optical heterodyne detection transmission, is not realized.

On the other hand, in the method used for an inter-satellite spatial optical transmission, the beacon light source 11 and the signal transmission light source 15 are provided on the transmitting side. Thus, since two light sources are necessary for this method, it can not be applied for a civilian use, which requires low cost, compactness, and low energy consumption.

Another technique is known where the wavefront of a signal beam and that of a locally oscillated beam are aligned by using a mechanical means for causing the locally oscillated beam to scan space. For the wavefront alignment, it is necessary to scan an entire space within an angular range of 0° to 15° in all directions in steps of 0.01°. As a result, a long time period is required as a response time of the wavefront synchronization time. Moreover, such a scanning has to be conducted each time the signal demodulating device is operated. Accordingly, this technique is not practical.

SUMMARY OF THE INVENTION

According to one aspect of the present invention, a spatial optical transmission apparatus includes: a light signal transmitting means for generating a signal beam which is modulated in accordance with a signal to be transmitted and is intensity-modulated with a lower frequency compared with a signal transmission speed; and a light signal demodulating means for receiving the signal beam from the light signal transmitting means by a detector, adjusting the direction of a locally oscillated beam based on the received signal beam so as to have a predetermined relationship with a direction of the signal beam so that intensity-modulated components in an output signal from the detector falls within a predetermined range of intensity, thereby aligning a wavefront of the signal beam with a wavefront of the locally oscillated beam, and extracting signal components which correspond to the transmitted signal from signal components modulated in accordance with the transmitted signal in the signal beam.

In one embodiment, the light signal transmitting means performs at least one of a frequency modulation and a phase modulation.

According to another aspect of the present invention, a spatial optical transmission apparatus includes: a light signal transmitting means; and a light signal demodulating means for receiving a light signal from the light signal transmitting means, wherein, the light signal transmitting means includes: an optical modulating means for outputting a second signal modulated in accordance with a first signal to be transmitted; a light intensity modulating means for outputting a third signal whose signal intensity periodically changes; a signal beam generating means, to which the second and third signals are input, for oscillating a signal beam which is coherent light with its light frequency and light intensity being modulated, and wherein, the light signal demodulating means includes: a light receiving element for receiving the signal beam; a local oscillator means for generating a locally oscillated beam coherent with the signal beam; an optical multiplexer means for mixing the signal beam and the locally oscillated beam; a photoelectric converting means for photoelectrically converting the beam signal mixed by the optical multiplexer means; a high frequency band pass means for gassing high frequency band components from an output of the photoelectric converting means; a transmission signal demodulating means for demodulating a transmission signal from an output of the high frequency band pass means; a low frequency band component pass means for passing low frequency band components from the photoelectric converting means; a processing means for processing the low frequency band components passed through the low frequency band component pass means; a scanning drive means for making the photoelectric converting means spatially scan based on a position detecting signal obtained by the processing means; and a local oscillation drive means for driving the local oscillator means.

In another embodiment, the optical modulating means performs at least one of a frequency modulation and a phase modulation.

According to still another aspect of the present invention, a spatial optical transmission method includes the steps of: a first step performed by a light signal transmitting means, in which a coherent beam is frequency-modulated in accordance with a transmission signal, and is intensity-modulated with a lower frequency compared with a signal transmission speed, and thereby a signal beam is generated and transmitted; a second step in which the signal beam is received by a detector, and a direction of a locally oscillated beam is adjusted to have a predetermined relationship with a direction of the signal beam so that intensity-modulated components of a signal output from the detector based on the received signal beam have a light intensity within a predetermined range, thereby aligning a wavefront of the signal beam and a wavefront of the locally oscillated beam with each other; and a third step of extracting signal components which correspond to the transmission signal from signal components modulated in accordance with the transmission signal.

According to still another aspect of the present invention, a spatial optical transmission method includes the steps of: a first step performed by a light signal transmitting means, in which a coherent beam is phase-modulated in accordance with a transmission signal, and is intensity-modulated with a lower frequency compared with a signal transmission speed, and thereby a signal beam is generated and transmitted; a second step in which the signal beam is received by a detector, and a direction of a locally oscillated beam is adjusted to have a predetermined relationship with a direction of the signal beam so that intensity-modulated components of a signal output from the detector based on the received signal beam have a light intensity within a predetermined range, thereby aligning a wavefront of the signal beam and a wavefront of the locally oscillated beam with each other; and a third step of extracting signal components which correspond to the transmission signal from signal components modulated in accordance with the transmission signal.

According to still another aspect of the present invention, a spatial optical transmission apparatus includes: a light signal transmitting means for generating and transmitting a signal beam modulated in accordance with a signal to be transmitted and intensity-modulated with a lower frequency compared with a signal transmission speed; and a light signal demodulating means for receiving and demodulating the signal beam from the light signal transmitting means, the light signal demodulating means including: an optical system for collecting and separating the signal beam; a multi-divided photodetective section for receiving one part of the signal beam collected and separated by the optical system; and a control section for controlling movement of at least the optical system so that a center portion of a detection area of the multi-divided photodetective section is irradiated with the signal beam.

According to still another aspect of the present invention, a spatial optical transmission apparatus includes: a light signal transmitting means for generating and transmitting a signal beam modulated in accordance with a signal to be transmitted and intensity-modulated at a lower frequency compared with a signal transmission speed; and a light signal demodulating means for receiving and demodulating the signal beam from the light signal transmitting means, wherein, the light signal demodulating means includes: an optical system for collecting and separating the signal beam; a multi-divided photodetective section for receiving one part of the signal beam collected and separated by the optical system; a waveguide path section for guiding the other part of the signal beam collected and separated by the optical system to a predetermined position; a light signal detecting section for receiving a light signal obtained by mixing the other part of the signal beam collected and separated by the optical system and a locally oscillated beam; and a control section for controlling movement of at least the optical system so that a central portion of a detection area of the multi-divided photodetective section is irradiated with the signal beam and, by using position detecting signal components obtained from a light signal received by the light signal detecting section, so that a wavefront of the signal beam and a wavefront of the locally oscillated beam are aligned.

According to still another aspect of the present invention, a spatial optical transmission apparatus includes: a light signal transmitting means for outputting a signal beam; a light signal demodulating means for receiving the signal beam from the light signal transmitting means, wherein, the light signal demodulating means includes: an optical system for collecting and separating the signal beam; first multi-divided photodetective section for receiving one part of the signal beam collected and separated into two parts by the optical system; a second multi-divided photodetective section for receiving the other part of the signal beam collected end separated by the optical system so that a spot radius thereof is larger than a spot radius of the signal beam formed on the first multi-divided photodetective section; and a control section for controlling movement of at least the optical system so that the spot radius of the signal beam is formed in equal size on each of photodetective areas of the second multi-divided photodetective section, and then controlling movement of at least the optical system so that a central portion of a detection area of the first multi-divided photodetective section is irradiated with the signal beam.

According to still another aspect of the present invention, a spatial optical transmission apparatus includes: a light signal transmitting means for outputting a signal beam; and a light signal demodulating means for receiving and demodulating the signal from the light signal transmitting means, wherein, the light signal demodulating means includes: a substrate; a mirror section inclined at 45 degrees; a plurality of photodetectors disposed in the vicinity of the mirror section for receiving the signal beam incident at a right angle onto a face of the substrate; a waveguide path section for guiding the signal beam reflected by the mirror section; an optical system composed of a collective lens and an optical multiplexer which are disposed in a course of the waveguide path section; a locally oscillated beam light source for outputting a locally oscillated beam to be sized with the signal beam by the optical multiplexer; and a signal beam receiving section for receiving the mixed beam from an output end of the waveguide path section, the mirror section, the plurality of photodetectors, the waveguide path section, the signal beam receiving section, the collective lens, the optical multiplexer, and the locally oscillated beam light source being disposed on the substrate so as to be integrated as one unit; and a control section for moving the substrate for controlling a wavefront alignment of the signal beam and the locally oscillated beam so that a spot radius of the signal beam is formed in equal size on each of the plurality of photodetectors and further moving the substrate so that the signal beam with which the signal beam receiving section is irradiated has a predetermined light intensity.

According to still another aspect of the present invention, a spatial optical transmission apparatus includes: a light signal transmitting means for outputting a signal beam; and a light signal demodulating means for receiving and demodulating the signal beam from the light signal transmitting means, wherein, the light signal demodulating means includes: a substrate; a waveguide path section for guiding the signal beam; a grating section for guiding the signal beam from the light signal transmitting means to the waveguide path section; a plurality of photodetectors disposed in the vicinity of the grating section for receiving the signal beam from the waveguide path section; an optical system composed of a collective lens and an optical multiplexer disposed in a course of the waveguide path section; a locally oscillated beam light source for outputting a locally oscillated beam to be mixed with the signal beam by the optical multiplexer; a signal beam receiving section for receiving the mixed beam from an output end of the waveguide path section, the waveguide path section, the grating section, the plurality of photodetectors, the signal receiving section, the collective lens, the optical multiplexer, the locally oscillated beam light source, and the signal beam receiving section being disposed on the substrate so as to be integrated as one unit; and a control section for moving the substrate for controlling a wavefront alignment of the signal beam and the locally oscillated beam so that a spot radius of the signal beam is formed in equal size on each of the plurality of photodetectors and further moving the substrate so that the signal beam with which the signal beam receiving section is irradiated has a predetermined light intensity.

According to still another aspect of the present invention, a spatial optical transmission apparatus includes: a light signal transmitting means for outputting a signal beam; and a light signal demodulating means for receiving and demodulating the signal beam from the light signal transmitting means, wherein, the light signal demodulating means includes: a substrate; a mirror section inclined at 45 degrees; a plurality of photodetectors disposed in the vicinity of the mirror section for receiving a signal beam incident at a right angle onto a face of the substrate; a locally oscillated beam light source for outputting a locally oscillated beam; a Y-shaped waveguide path section for mixing the signal beam reflected by the mirror section and the locally oscillated beam from the locally oscillated beam light source; a signal beam receiving section for receiving the mixed beam from an output end of the Y-shaped waveguide path section, the mirror section, the plurality of photodetectors, the locally oscillated beam light source, the Y-shaped waveguide path section and the signal beam receiving section being disposed on the substrate so as to be integrated as one unit; and a control section for moving the substrate for controlling a wavefront alignment of the signal beam and the locally oscillated beam so that a spot radius of the signal beam is formed in equal size on each of the plurality of photodetectors and further moving the substrate so that the signal beam with which the signal beam receiving section is irradiated has a predetermined light intensity.

According to still another aspect of the present invention, a spatial optical transmission apparatus includes: a transmission light source for emitting a signal beam obtained by intensity-modulating a transmission signal; a means for causing a plane of polarization of signal beam components in the signal beam emitted from the transmission light source to be a circularly polarized beam; and a signal demodulating means for receiving a light signal of the circularly polarized beam and for producing a coherent optical heterodyne detection.

The above-mentioned structure makes it possible to transmit a coherent beam, modulated in accordance with a signal to be transmitted and intensity-modulated with a sufficiently lower speed compared with the signal transmission speed. That is, a signal transmitting device has a signal beam generating means and performs the modulation in accordance with the transmission signal, and outputs a beam from the same light source, whose light intensity is modulated with a sufficiently lower speed compared with the signal transmission speed, as a position detection signal into the air. This transmission signal beam is input in a light receiving element provided in a signal demodulating device. In accordance with the intensity of the position detection signal obtained from an output of the light receiving element, the direction of the received transmission signal beam and that of a locally oscillated beam are adjusted to have a predetermined relationship. At the same time, by detecting a beat signal obtained in this way, the wavefront of the transmission signal beam and that of the locally oscillated beam are aligned with each other.

A spatial optical transmission system providing such spatial optical transmission apparatus and spatial optical transmission method is capable of a transmission at a high S/N ratio (signal to noise ratio) compared with that provided by a conventional spatial optical transmission apparatus based on light intensity modulation and direct detection or using a diffused locally oscillated beam. In addition, a high-speed transmission, which is characteristic of the spatial optical transmission utilizing coherency of a beam, is realized. Moreover, the transmission can be performed by using only one light source, the apparatus can be made more compact and usable at low energy consumption.

A control section of the apparatus controls movement of at least an optical system so that detector output signals from respective detection areas of the multi-divided photodetective section become equal to one another, i.e., so that a beam collection point of the signal beam is formed on the center of the detection areas of the multi-divided photodetective section. Thus, the wavefront alignment with a signal beam propagated across the air and incident at a larger solid angle can be performed at a high-speed and more efficiently.

In this state, the beam propagated across the air can be coupled with a waveguide path such as an optical fiber to some extent. Accordingly, by controlling movement of at least the optical system so that the position detection signal component obtained from the light signal received by the photodetective section becomes maximum, the coupling can be performed more precisely with an improved coupling efficiency compared with the case where the positioning is performed based on only the output from the multi-divided photodetector.

In addition, a waveguide path such as an optical fiber allows a heterodyne optical system or the like to be easily structured in the free space by using optical components. Such a system, in which a signal beam can be guided to a stable non-movable optical part, is more suitable for making a precise optical system for wavefront alignment or the like, compared with a conventional system in which the optical part is movable.

First, the control section controls movement of the optical system for performing the wavefront alignment based on a detection signal obtained from the second multi-divided photodetective section with a large irradiation spot radius. Next, the control section controls movement of the optical system for performing the wavefront alignment based on a detection signal obtained from the first multi-divided photodetective section with a small irradiation spot radius. Thus, an angle permitting the wavefront alignment function is larger, and controllability of the wavefront alignment improves.

In addition, by integrating the first multi-divided photodetective section and the optical fiber into one unit, the optical part of the signal demodulating device can be easily small-sized and stabilized. Further, integration of the collective lens, the optical fiber and the first multi-divided photodetective section allows the optical system to be more stabilized, consisted of a less number of members, and operable with a smaller amount of positioning operations.

Moreover, the mirror section, the plurality of photodetectors, the waveguide path section, the signal beam receiving section, the collective lens, the optical multiplexer, and the locally oscillated beam light source may be configured on the same substrate so as to be Integrated as one unlit. This configuration enables a stable optical system which is not affected by disturbance when performing the wavefront alignment. In addition, the locally oscillated beam light source end the photodetector may be formed on the substrate by using a selective growth method such that they are partially buried in the substrate, which results in improvement of the positional accuracy. Furthermore, in the case where the grating section is provided in addition to the integrated system, the system can dispense with the collective lens for the waveguide path or an operation for positioning the lens. This allows the optical system to be small-sized and more simply assembled. In addition, the above-mentioned integrated wave guide path may be replaced with a Y-shaped waveguide path. Then, there is no need to form the collective lens or the optical multipler to be partially buried in the substrate, and thus the fabricating process may be simplified.

In the case where the beam is output as a linearly polarized beam and subjected to the optical heterodyne detection, it is required not only to tune the oscillation wavelength but also align the plane of polarization. However, the necessity of alignment of the plane of polarization is eliminated by an arrangement in which a quarter-wave plate is inserted in the output portion of the signal beam light source of the light signal transmitting means, for converting the beam into a circularly polarized beam before being output in the air. Thus, the signal demodulating means may have a simpler configuration, and the signal can be received more quickly. Meanwhile, since the beat signal is obtained only from the components corresponding to TE mode in the signal beam transmitted as a circularly polarized beam. This results in a loss with respect to the entire power of the transmission signal. However, a stable signal detection is always ensured, even if the plane of polarization is changed because of reflection by a wall or the like.

Thus, the present invention described herein makes possible the advantages of (1) providing a spatial optical transmission apparatus capable of performing a high-speed transmission at an improved S/N ratio, with a compact structure and a low energy consumption, and (2) providing a spatial optical transmission method using the same.

These and other advantages of the present invention will become apparent to those skilled in the art upon reading end understanding the following detailed description with reference to the accompanying figures.

BRIEF DESCRIPTION OF THE DRAWINGS

FIG. 7 is a schematic structural diagram showing a photodetective section and a transmission signal device provided in a spatial optical transmission apparatus of Example 5 of the present invention.

FIGS. 14A–14H are cross sectional views showing respective steps of a method for fabricating the multi-divided photodetector shown in FIG. 10.

DESCRIPTION OF THE PREFERRED EMBODIMENTS

The present invention will be described by way of examples with reference to accompanying drawings.

EXAMPLE 1

Figure 1:
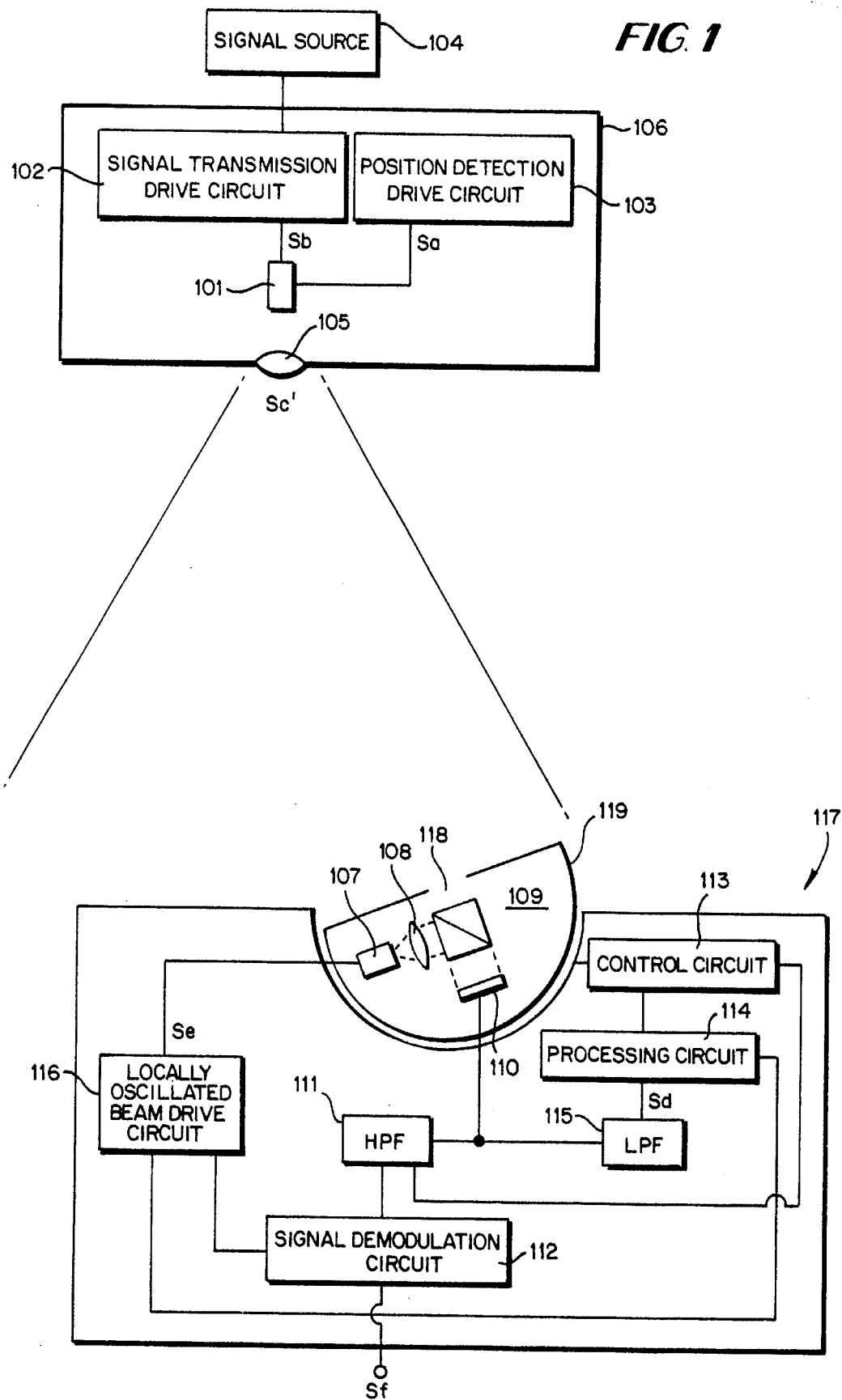
FIG. 1 is a block diagram showing a spatial optical transmission apparatus of Example 1 of the present invention.
Figure 2A:
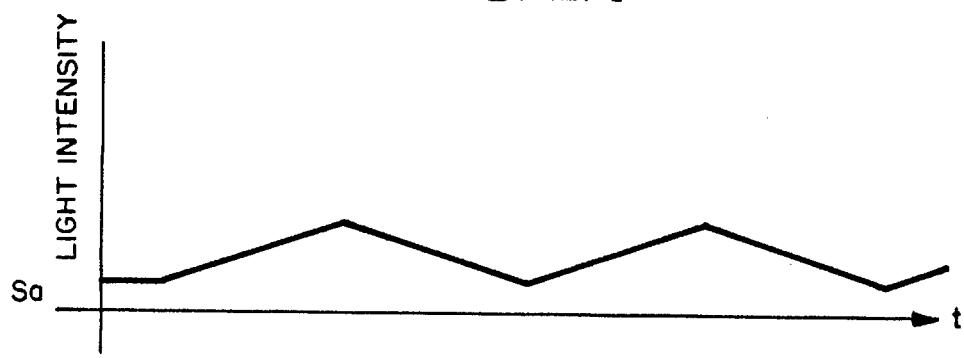
FIG. 2 is waveform charts (a)–(f) for each main section of the spatial optical transmission apparatus shown in FIG. 1.
Figure 2B:
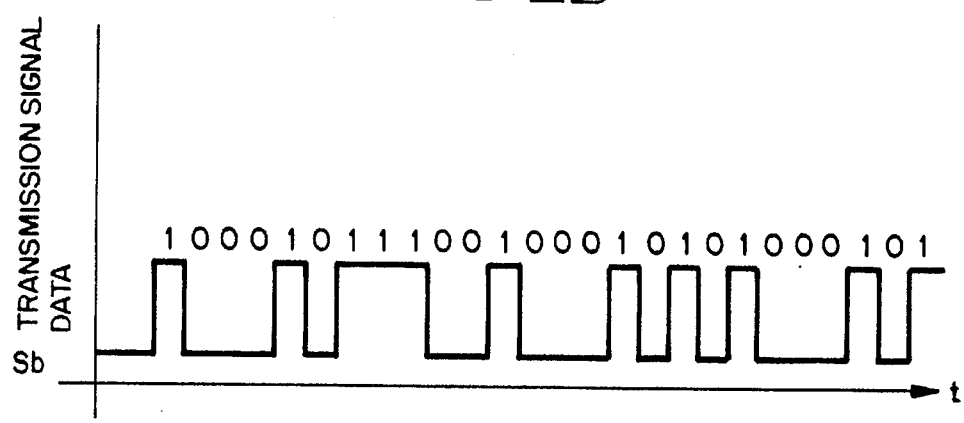
Figure 2C:
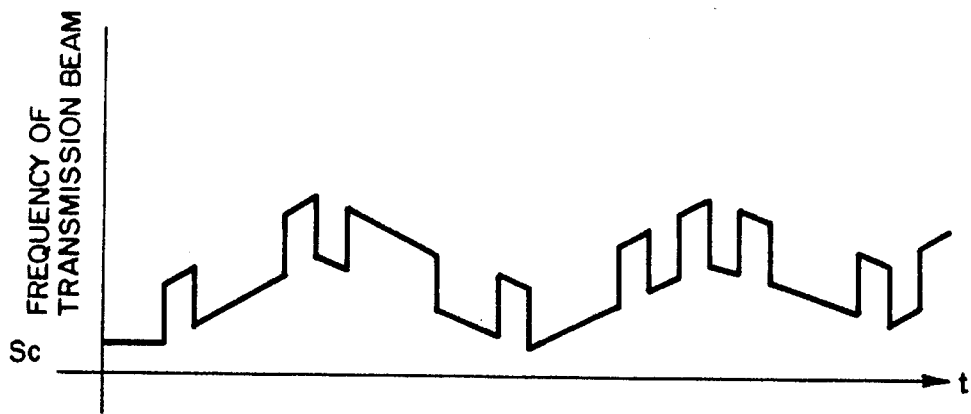
Figure 2D:
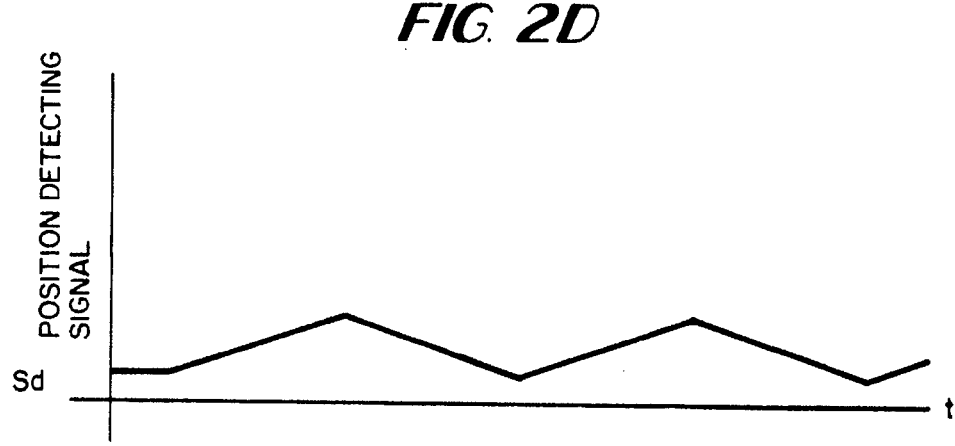
Figure 2E:
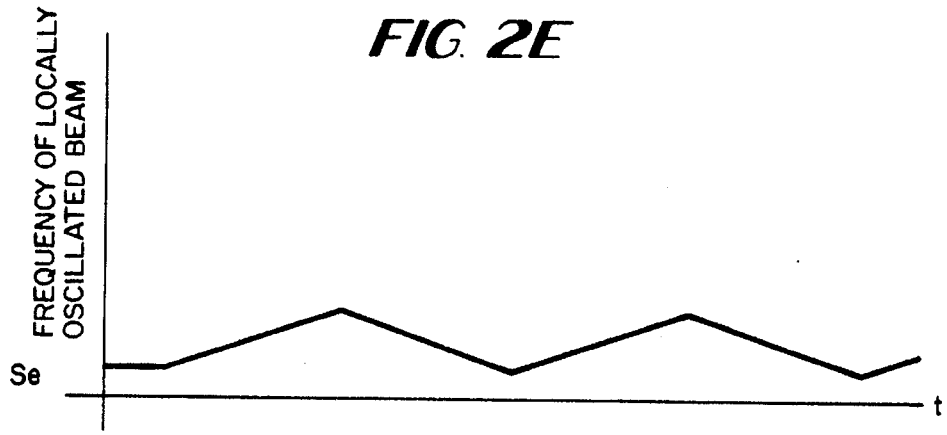
Figure 2F:
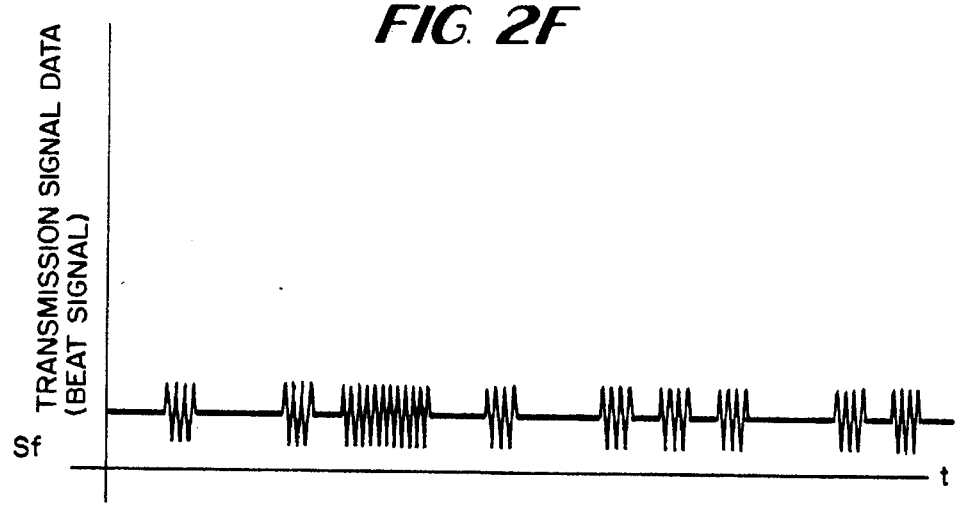

With reference to FIGS. 1 and 2, Example 1 of the present invention will be described hereinafter. FIG. 1 illustrates a block diagram showing a configuration of a spatial optical transmission apparatus of the present example. FIG. 2 shows waveform charts for explaining the operation of the apparatus of the present example.

As shown in FIG. 1, the spatial optical transmission apparatus of the present example includes a signal transmitting device 106 and a signal demodulating device 117 which operates as a receiving device. The signal transmitting device 106 has a transmission light source 101. A DBR (Distributed Bragg Reflector) laser oscillator of an InGaASP type (oscillating frequency: 1.3 μm) may be used as the transmission light source 101. A signal transmission drive circuit 102 outputs a signal in accordance with transmission signal data Sb as shown in chart (b) of FIG. 2 from an external signal source 104. The output signal of the signal transmission drive circuit 102 is applied onto a signal modulation region (diffraction grating) of the laser oscillator, i.e., the transmission light source 101. Due to a plasma effect caused by a carrier of the applied signal, the refractive index in the laser oscillator changes. Thus, the frequency modulation is performed.

The above-mentioned "plasma effect" refers to a change in a seeming dielectric constant (refractive index) n within a substance, caused by an interaction between electrons within the substance and an electromagnetic wave (light beam), and is expressed as follows:

$$n = \sqrt{1 - \frac{N_e e^2}{\epsilon_0 \omega^2 m_e}} \simeq 1 - \frac{e^2}{2\epsilon_0 \omega^2 m_e} N_e$$

wherein $N_e$: the number of injected electrons, $m_e$: effective mass of the electrons, and $\omega$: angular frequency of a light beam (electromagnetic wave).

An example of the modulating method with the use of this DBR laser will be described. In accordance with a transmission signal (0, 1), the light frequency of the transmission signal at a transmission speed of 100 Mbps is FSK-modulated (Frequency Shift Keying) by using two kinds of frequency $f_1$ and $f_2$ ($f_2-f_1=1$ GHz). A position detecting signal is generated by means of a position detection drive circuit 103, by modulating the intensity of a current to be injected into an active layer of the same DBR laser in accordance with known code series Sa shown in chart (a) of FIG. 2 and with a sufficiently lower speed e.g., at 10 kbps compared with the transmission speed of the transmission signal data Sb. Thus, a signal beam Sc is obtained by modulating the light intensity of the transmission signal data Sb and the position detecting signal, and is output in the air as a transmission beam, for example at about 60 mW.

The transmission beam from the DBR laser at this time is frequency-modulated due to a thermal effect resulting from modulation of the current which is injected into the active layer for an intensity-modulation as a position detecting signal. This frequency-modulated beam is subjected to an FSK-modulation or PSK-modulation, and becomes an output Sc as shown in chart (c) of FIG. 2. The signal demodulating device 117 has a housing 119 provided with an aperture 118 for limiting the area through which a beam enters. A signal detector 110 is provided inside the housing 119 at such a position that points to the aperture 118. Thus, the signal detector 110 is arranged to detect only a signal beam within a predetermined range including the direction in which the aperture 118 points to.

An InGaAs based photodiode or the like is used as the signal detector 110. An output signal Sd of this signal detector 110 includes, as a position detecting signal, components whose light intensity is modulated with a sufficiently lower speed e.g., 10 kbps compared with the transmission speed of the transmitting data Sb. The output signal Sd includes also beat signal components corresponding to the transmission signal data Sb, for example, DC components and signal components of a frequency of 1 GHz with respect to frequency $f_1$ of the locally oscillated beam.

When the output Sd of the signal detector 110 is input to a low frequency band pass circuit 115 with a cut-off frequency of 100 kHz, only intensity modulated components are obtained, and these components are the above-mentioned position detecting signal.

The output signal of the low frequency band pass circuit 115 is input to a processing circuit 114. In order that the intensity of the output signal of the low frequency band pass circuit 115 becomes a predetermined intensity, the processing circuit 114 causes a control circuit 113 to drive the housing 119, for example, in such a manner that the housing 119 rotates around each of two rotational axes orthogonal to each other, whereby the direction in which the signal detector 110 points to scan space. In this way, the wavefront of the signal beam and that of the locally oscillated beam are aligned on the light receiving face of the signal detector 110. The drive operation for the spatial scanning by the signal detector 110 can be performed, for example, by using an actuator or the like.

An operation for detecting the transmission signal from the received signal beam will be described hereinafter. First, based on the position detecting signal output from the low frequency band pass circuit 115, the signal beam and the locally oscillated beam from a local oscillator 107, having a frequency of $f_1$, for example, are subjected to wavefront alignment and mixed by an optical multiplexer 109. An output beam from the optical multiplexer 109 is received by the signal detector 110. Thus, a coherent optical heterodyne detection is performed for the received beam by means of the locally oscillated beam. At this point, the transmission signal has been subjected to a base band modulation of the light frequency by the light intensity-modulated signal (position detecting signal). Accordingly, the locally oscillated beam having a frequency of $f_1$ is required to be subjected to a base band modulation as shown in chart (e) of FIG. 2. This base band modulation can be performed by a locally oscillated beam drive circuit 116 whose output signal is synchronized with the signal obtained from the light intensity-modulated signal.

The output signal obtained from the signal detector 110 is a beat signal containing the intensity-modulated components as a position detecting signal. For instance, this output signal is input to a high frequency band pass circuit 111 with s cut-off frequency of 500 MHz, so that only a beat signal is detected. In order that the intensity of the beat signal of the obtained frequency f becomes maximum, the housing 119 accommodating the signal detector 110 and the local oscillator 107 is mechanically driven for causing the signal detector 110 to scan space with a small unit solid angle. Thus, the wavefront alignment is performed for detecting the signal. An output signal of the high frequency band pass circuit 111 is input to a signal demodulation circuit 112. In this way, the transmission signal data Sf as shown in chart (f) of FIG. 2 is obtained.

This configuration of the apparatus allows the signal demodulating device 117 to continuously track the signal transmitting device 106 even if the position of the receiving device equipped with the signal demodulating device 117 and/or that of the signal transmitting device 106 change greatly in space. Hence, the signal can be continuously detected by the signal demodulating device 117. Furthermore, this configuration allows one transmission light source 101 to generate both the transmission signal and the position detecting signal, and permits one signal detector 110 to perform both the signal detection and the position detection. Accordingly, this configuration can make the spatial optical transmission apparatus less expensive and smaller, and operable at a lower consumption of energy.

Furthermore, when a spatial optical transmission apparatus has a plurality of signal transmitting devices 106 and a plurality of signal demodulating devices 117, there are some cases where each of the signal transmitting devices 106 uses a different intensity-modulated position detecting data series Sa shown in chart (a) of FIG. 2. In this case, the direction of the signal detector 110 of the signal demodulating device 117 is determined so that the intensity of the modulated position detecting data signal of the signal transmitting devices 106, desired to be received by any one of the signal demodulating devices 117, becomes maximum. In this way, the wavefront alignment of the signal beam and the locally oscillated beam is assured in the determined direction, thus making it possible to selectively receive an arbitrary signal.

In the present example, the intensity-modulated data is obtained by a modulation using a triangular wave. Needless to say, the same effect can be obtained by a modulation using such waveforms as rectangular wave, sine wave, etc.

EXAMPLE 2

Figure 3:
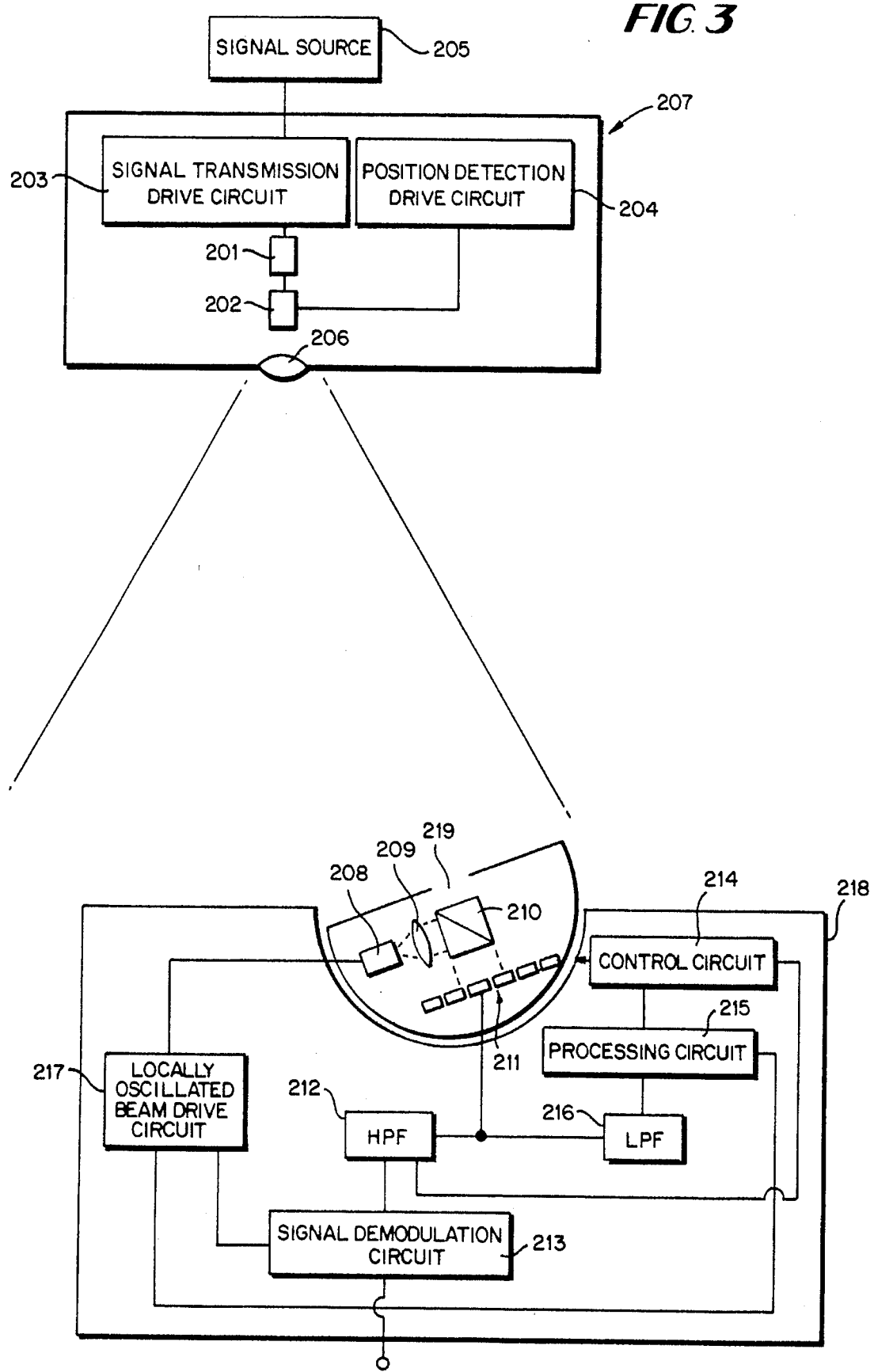
FIG. 3 is a block diagram showing a spatial optical transmission apparatus of Example 2 of the present invention.

The spatial optical transmission apparatus of Example 2 of the present invention will be described hereinafter. The apparatus of Example 2 includes components similar to those of Example 1, and descriptions thereof will be omitted for simplicity. FIG. 3 illustrates a block diagram showing the configuration of the apparatus, which has a signal transmitting device 207 and a signal demodulating device 218.

A light source 201 provided in the signal transmitting device 207 is, for example, a GaAs based DFB laser (oscillating frequency: 0.78 μm). A signal transmission drive circuit 203 performs demodulation of the light frequency, in accordance with the transmission data from an external signal source 205. A beam emitted from the light source 201 is input to an electro-absorption type demodulator 202. The demodulator 202 is driven by a position detection drive circuit 204, in accordance with known data series and with a sufficiently lower speed as compared with the transmission signal speed for intensity-modulating the emitted beam. Diffused through a lens 206, the modulated beam is output in the air.

Similar to Example 1, the signal demodulating device 218 has an aperture 219 for limiting the area through which the beam enters. Thus, a two-dimensional array detector 211 can detect only a signal beam within a predetermined range including the direction in which the aperture 219 is directed to. The signal demodulating device 218 of the present example includes, as a signal detector, the two-dimensional array detector (hereinafter, referred to as the detector) 211 having Si photodiodes arranged in the form of a two-dimensional array. An output signal of the detector 211 is input to a low frequency band pass circuit 216, whereby the position detecting signal can be extracted similarly to Example 1. The extracted position detecting signal is processed by a processing circuit 215, so that the detection face of the signal detector 211 points to the signal transmitting device 207, by means of a control circuit 214. Such a control ensures the wavefront alignment of the signal beam and the locally oscillated beam.

By using the electro-absorption type demodulator 202 in the above-mentioned manner, a large extinction ratio is obtained with respect to the intensity of the position detecting signal on the side of the transmission unit side 207. The extinction ratio means a difference between the light intensity at the time of an ON signal and that at the time of an OFF signal addition, by using the two-dimensional array signal detector 211, a beam incoming from a space within the range of mechanical scanning by the signal detector 110 of Example 1 can be simultaneously detected in the two-dimensional array signal detector 211. Accordingly, the spatial optical transmission apparatus of the present example does not need to mechanically scan space by using the signal detector 211 in order to detect the position detecting signal. As a result, a speedy response for the wavefront alignment operation is realized.

The output from the signal detector 211 is input to a high frequency band pass circuit 212 so that the beat signal is extracted similarly to Example 1. The wavefront alignment is performed using the signal detector 211, for mechanically scanning space with a small unit solid angle so that the signal intensity of the beat signal becomes maximum, and the transmission signal is demodulated by a signal demodulation circuit 213.

Effects similar to those of Example 1 can be attained also with the example described hereinbefore.

The external electro-absorption type demodulator 202 used in the present example can be replaced with another demodulator of any other configuration. The light source 201 and the external demodulator 202, which are separately and independently provided in the present example, may be integrated as one unit.

Figure 4:
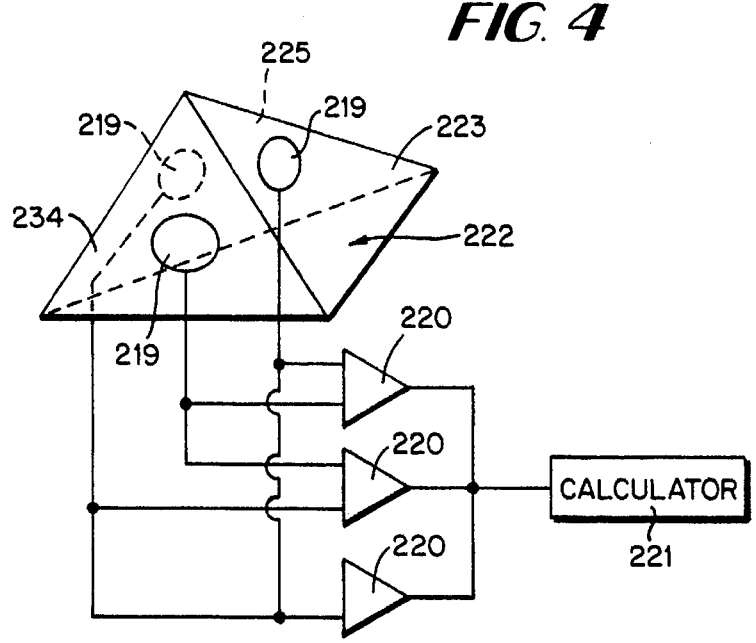
FIG. 4 is a block diagram showing a position detector of a spatial optical transmission apparatus of one modification of Example 2 of the present invention.

One modification of the second example of the present invention will be described hereinafter. As shown in FIG. 4, a position detector may be alternatively configured to have detectors 219 respectively provided on three faces 223, 224 and 225 of a trigonal pyramid shaped attachment 222. In the signal detectors 110 and 211 of Example 1 and 2 and the detectors 219 of this modification, only the intensity components of a beam orthogonally incident upon the detection surface of the signal detectors 219 are output. Accordingly, detected signals from the three signal detectors 219 are compared with each other by three comparators 220, and thereby intensity differences among the detected signals are output. On the basis of an output signal of each comparator 220, the direction of a signal transmitting device (not shown) which the detection face of the position detector points can be calculated by e calculator 221. This configuration assures a speedy response for the wavefront alignment, in addition to the effects described with respect to Examples 1 and 2. Moreover, the number of the detectors required for position detection is reduced.

EXAMPLE 3

Figure 5:
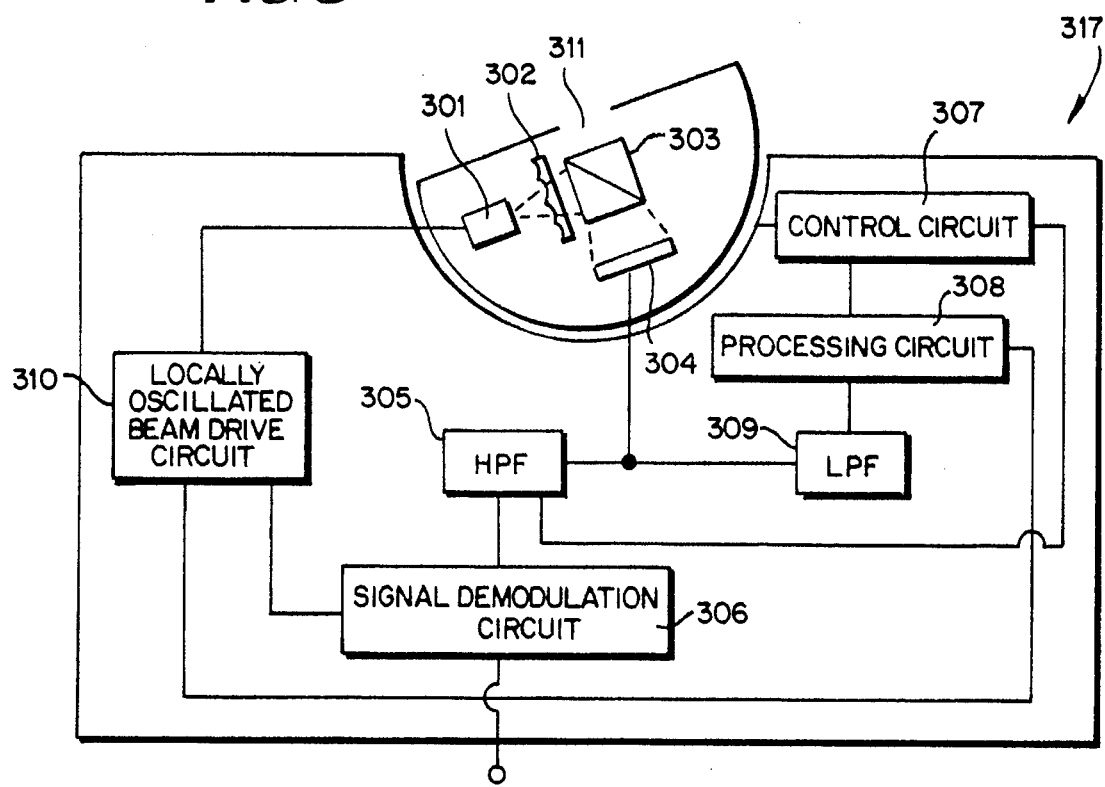
FIG. 5 is a block diagram showing a signal demodulating device of a spatial optical transmission apparatus of Example 3 of the present invention.
Figure 6A:
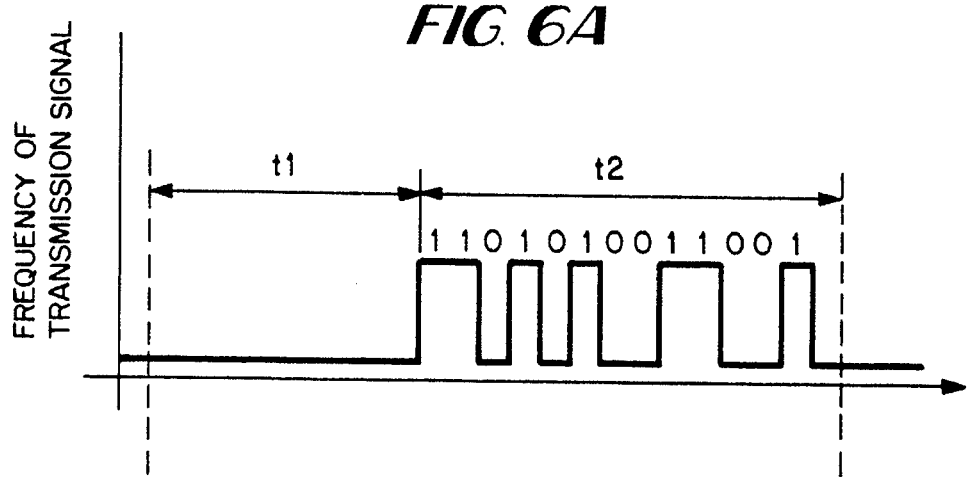
FIG. 6 is waveform charts (a)–(f) for a transmission method of a spatial optical transmission apparatus of Example 4 of the present invention.
Figure 6B:
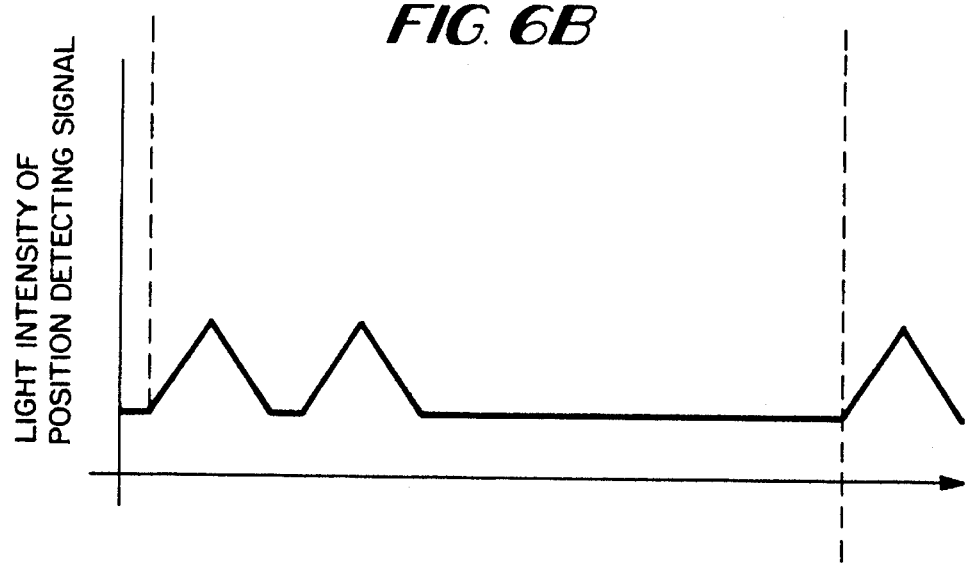
Figure 6C:
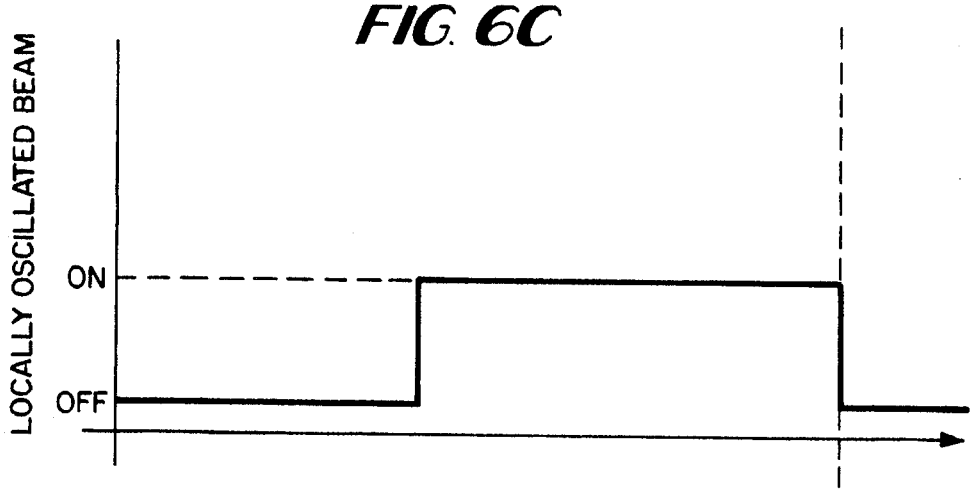
Figure 6D:
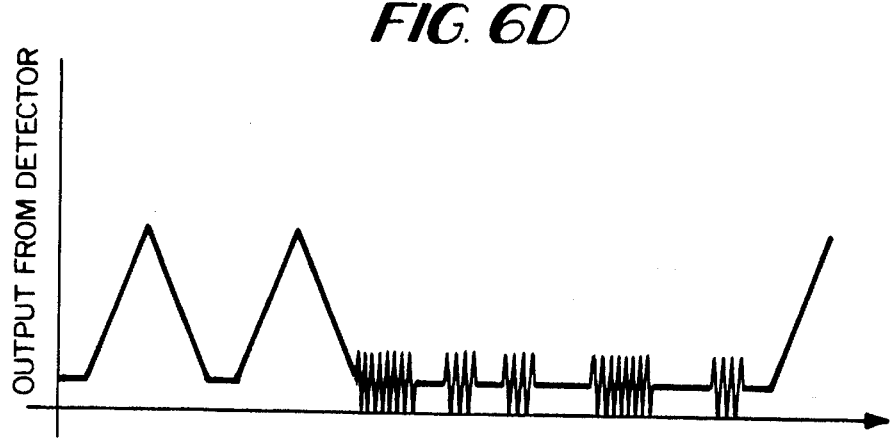
Figure 6E:
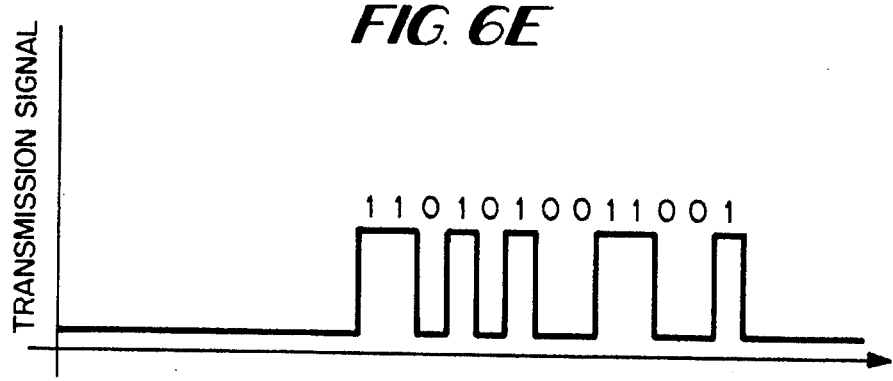
Figure 6F:
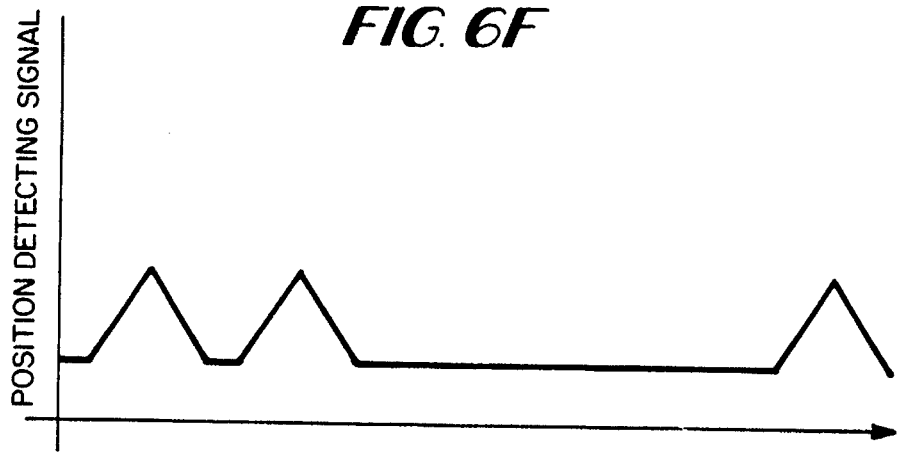

A spatial optical transmission apparatus of Example 3 according to the present invention is described hereinafter, with reference to FIG. 5. This apparatus includes components similar to those of Example 1 or 2, and description thereof will be omitted here for simplicity.

According to the present example, a spatial optical transmission apparatus includes a signal demodulating device 317 having an aperture 311 similar to Example 1. Thus, a signal detector 304 can detect only a signal beam within a predetermined range including the direction in which the aperture 311 is directed to. In the signal demodulating device 311, an output signal of the signal detector 304 is input to a low frequency band pass circuit 309. A position detecting signal is processed by a processing circuit 308. Thus, in order to make the intensity of the position detecting signal maximum, the signal detector 304 is positioned by e control circuit 307 so that the detection face of the signal detector 304 points to the signal transmitting device. This control assures the wavefront alignment of a signal beam and a locally oscillated beam.

The output signal of the signal detector 304 is input to a high frequency band pass circuit 305, so that a beat signal is extracted similarly to Example 1. By using the signal detector 304, space is mechanically scanned with a small unit solid angle for wavefront alignment so that the intensity of the beat signal becomes maximum. The transmission signal is demodulated by a signal demodulation circuit 306. Herein, the transmission signal can be detected without precisely performing the wavefront alignment by using e locally oscillated beam diffused at a small angle of about 1 degree by a microlens array 302.

Next, similar to the above-mentioned examples, the received transmission signal beam and the locally oscillated beam from a local oscillation circuit 301, which is diffused by the microlens array 302, are subjected to the wavefront alignment and then mixed by an optical multiplexer 303. The output signal of the signal detector 304 is input to the high frequency band pass circuit 305 and thereby the transmission signal is extracted and demodulated by the signal demodulation circuit 306.

Effects similar to those of the above-mentioned Examples 1 and 2 can be attained also with the present example. As mentioned above, by using the locally oscillated beam which is diffused only at a small angle, the wavefront alignment can be performed without mechanically scanning space with a small unit solid angle. Furthermore, even if the signal demodulating device 317 moves through a small distance, the wavefront alignment need not be performed at each movement. In addition, since the locally oscillated beam is diffused only at a small angle, lowering of the intensity of a locally oscillated beam does not cause a problem.

EXAMPLE 4

The spatial optical transmission method of Example 4 will be described with reference to FIG. 6. FIG. 6 illustrates waveform charts showing a transmission method for a spatial optical transmission apparatus of Example 4 of the present invention. The spatial optical transmission apparatus for applying the method of the present example to practical use is exemplified by the apparatus shown in FIG. 1.

The transmission period of a transmission light source 101 provided in the signal transmitting device 106 is divided as shown in chart (a) of FIG. 6. The position detecting signal is intensity-modulated for a time period $t_1$ shown in chart (a) of FIG. 6 in a manner as shown in chart (b) of FIG. 6. Thus, the signal is frequency-modulated for a time period $t_2$ as shown in chart (a) of FIG. 6. A signal beam is generated based on thus modulated signal, diffused and output in the air.

In the signal demodulating device 117, a local oscillator 107 is off during the time period of receiving the position detecting signal, and is on during the time period of receiving the signal beam, as shown in chart (c) of FIG. 6. Thus, the locally oscillated beam is mixed with the signal beam by the signal detector 110. The intensity-demodulated position detecting signal as shown in chart (f) of FIG. 6 is extracted from the signal beam. The oscillation of the locally oscillated beam can be easily started or stopped, by being synchronized with the extracted signal. The wavefront alignment of the signal beam and the locally oscillated beam is performed so that the intensity of the position detecting signal obtained from the output from the signal detector 110 as shown in chart (d) of FIG. 6 during the time period $t_1$ becomes maximum. The transmission signal shown in chart (e) of FIG. 6 is demodulated from a beat signal which is obtained during an output time period $t_2$ of the signal detector 110. In this way, the spatial optical transmission is performed.

Effects similar to those of the above-mentioned examples can be attained also with the present example.

EXAMPLE 5

Figure 8:
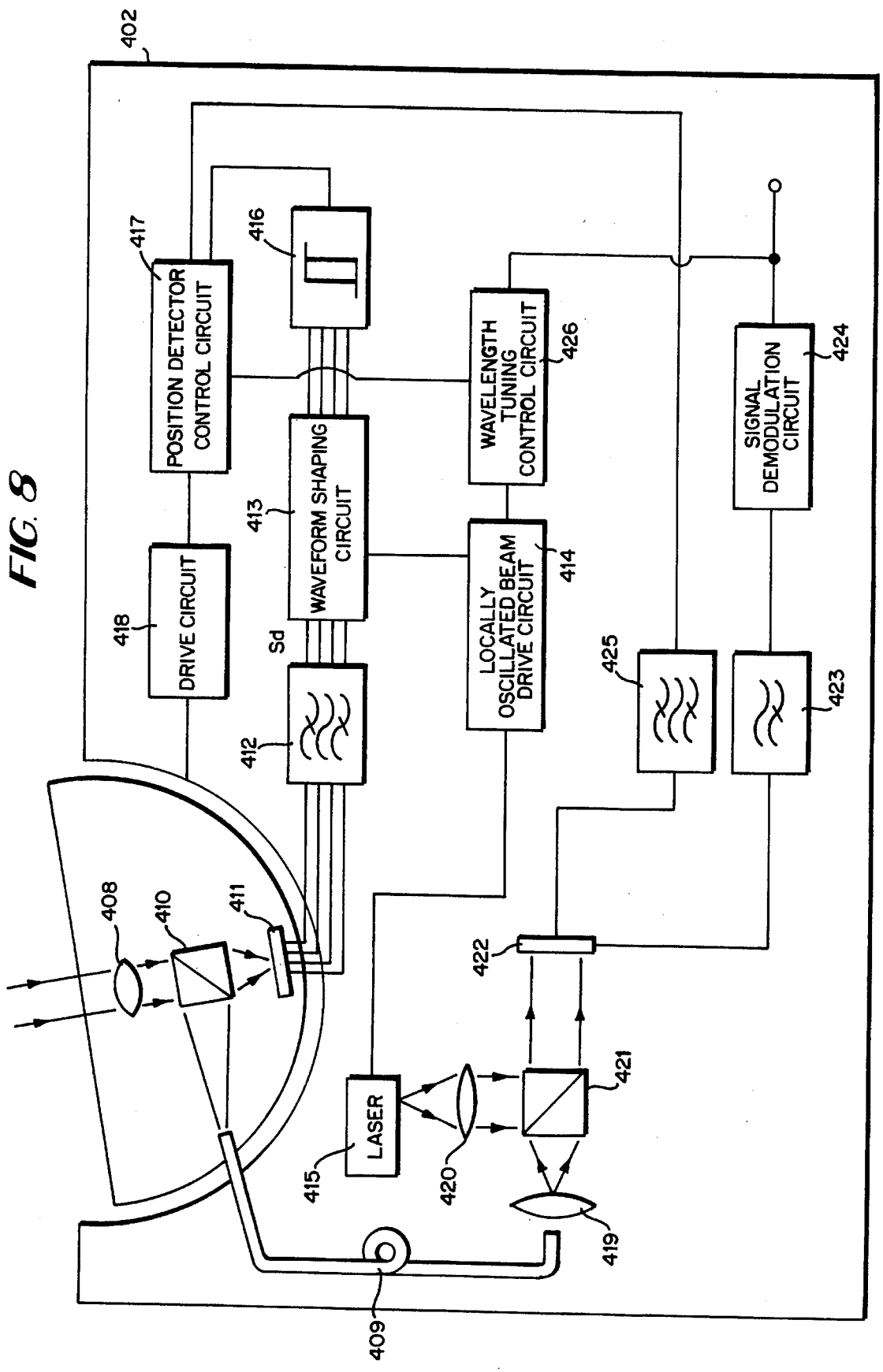
FIG. 8 is a block diagram showing the configuration of a signal demodulating device in which the photodetective section shown in FIG. 7 is incorporated.

FIG. 7 illustrates a schematic structural diagram showing a photodetective section and a signal transmitting device of a spatial optical transmission apparatus of Example 5. FIG. 8 illustrates a block diagram showing a configuration of a signal demodulating device in which the photodetective section of FIG. 7 is combined.

As is apparent from FIGS. 7 and 8, the spatial optical transmission apparatus includes a signal transmitting device 401 and a signal demodulating device 402 which serves as a receiving device. The signal transmitting device 401 has a transmission light source 405. This transmission light source 405 is, for example, an InGaAsP based DBR (Distributed Bragg Reflector) laser oscillator (oscillating frequency: 1.3 μm). In accordance with the transmission signal data from an external signal source 403, a signal sb output from a signal transmission drive circuit 404 is applied onto a signal modulation region (diffraction grating) of the laser oscillator serving as the light source 405. The refraction index of the laser oscillator changes due to a plasma effect caused by a carrier of the applied signal, whereby the frequency of emitted light is modulated. A position detection drive circuit 406 performs the light intensity modulation by means of a position detecting signal sa obtained by modulating a current to be injected in an active layer of the laser oscillator in accordance with the known data series and with a sufficiently lower speed e.g., 100 kbps compared with the transmission speed of the transmission signal data. The signal beam sc obtained by optically modulating the transmission signal and the position detecting signal is output in the air through a lens 407.

In this way, from the signal transmitting device 401, the transmission beam of 100 Mbps optically modulated so that intermediate frequency of the signal demodulating device 402 becomes 1 GHz, and with a signal intensity-modulated as a position detecting signal beam sa by a sine wave of 100 kbps are both transmitted by using one light source 405. Herein, an intensity-modulated signal and a signal which corresponds to the transmission data are applied by using a DFB laser having a single pole as the transmission light source 405. Thus, the modulation effects similar to those obtained by a method of using a DBR laser for providing a light frequency modulation in an active layer in accordance with the intensity-modulated signal and on a diffraction grating in accordance with the transmission data (see FIG. 2). In addition, the position detecting signal beam having a frequency of 100 kbps is adopted, because the lower frequency band allows use of a filter with a narrower frequency band, which is effective for improvement of the S/N ratio of the position detecting signal.

The transmission beam is subjected to an aperture limitation by a 0.5 cm×0.5 cm mask provided in the signal demodulating device 402, and then is incident on a photodetective section 402a. The incident beam is collected by a lens 408. The numerical aperture (NA) of this lens 408 and that of an optical fiber 409 are preferably adjusted to be the same, whereby the loss of an optical coupling efficiency can be reduced. In the case of a 0.8 μm band single mode fiber, NA thereof is typically about 0.1. Therefore, the present example uses a lens having NA of 0.1 and focal length of 30 mm. Thus, the coupling loss between the beam incident on the lens 408 and the optical fiber 409 can be suppressed approximately to 0.5 dB.

The incident beam from the lens 408 is separated into two parts at an arbitrary ratio by an optical demultiplexer 410. One part of the separated beam is incident on a multi-divided photodetector 411. Via a low pass filter circuit or band pass filter circuit 412, noise components are removed from the output signal of the multi-divided photodetector 411 so that only position detecting signal components Sd are detected as shown in chart (d) of FIG. 2. Though a desired position detecting signal can be detected only by a low pass filter circuit, it is better to use a band pass filter circuit which is more suitable for removing noise components.

Figure 9:
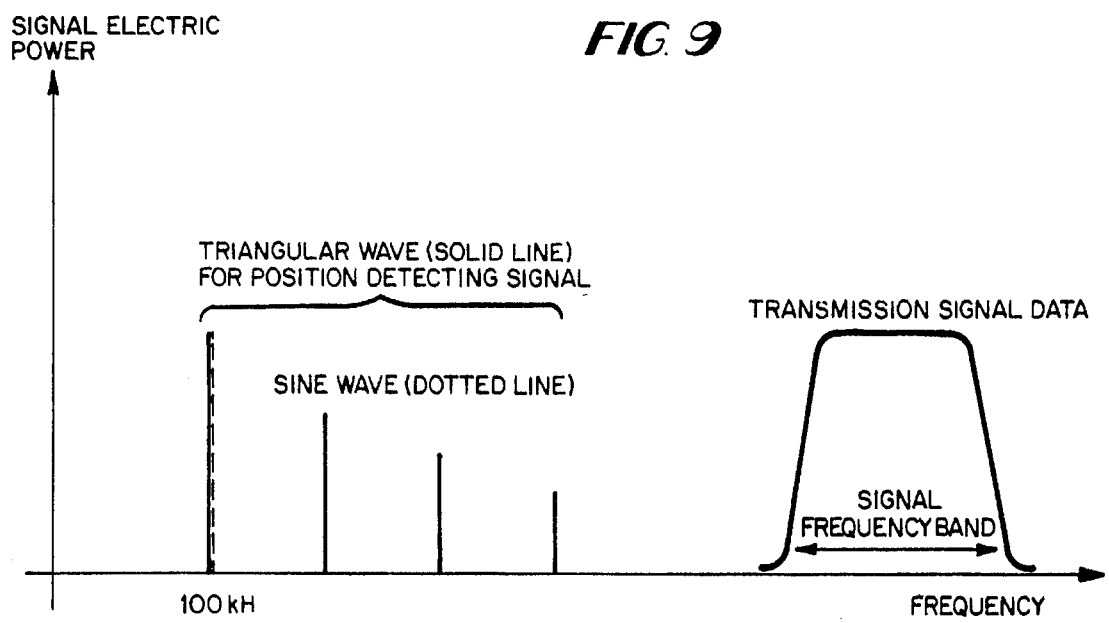
FIG. 9 is a frequency spectral chart showing a transmission beam from the transmission signal device shown in FIG. 7.

FIG. 9 illustrates a diagram showing a frequency spectrum of a transmission beam from the signal transmitting device shown in FIG. 7. As shown in FIG. 9, when using a sine wave for the position detecting signal, the transmission of the beam of the narrowest frequency band becomes possible. Namely, the signal can be extracted by a filter which transmits only the frequency indicated with a dotted line in FIG. 9. The present example adopts a filter having a transmission band of 200 Hz for the signal of 100 kHz. If a triangular wave is used as the position detecting signal, the band width of the filter for detecting the signal is required to be five to seven times that for the signal of 100 kHz as indicated by a solid line. This results in increase of noise components. Accordingly, the detection with best S/N ratio is realized by using a sine wave.

An output signal from each unit detector of the multi-divided photodetector 411 is input to a waveform shaping circuit 413 via a band pass filter circuit 412, whereby the signal is amplified to an arbitrary level. In accordance with a signal output from the waveform shaping circuit 413, a local oscillator laser 415 is driven by a locally oscillated beam drive circuit 414. In the case of the transmission method shown in FIG. 2, the locally oscillated beam drive circuit 414 is driven so that the locally oscillated beam is synchronized with triangular wave modulation components shown in chart (d) of FIG. 2 so as to be triangular-wave-modulated. In the case of a transmission method shown in FIG. 6, the circuit 414 is driven so that when a position detecting signal is transmitted, the locally oscillated beam is OFF to detect the position detecting signal, and when a position detecting signal is not transmitted the locally oscillated beam is ON to perform an optical heterodyne detection for detecting the transmission signal.

With respect to a beam guided to the multi-divided photodetector 411, which is multi-divided and used for the position detection, an integral intensity or peak value of output values of the respective unit detectors obtained by the waveform shaping circuit 413 is detected. The output signals are compared with one another by a comparator 416. The output signal of the comparator 416 is input to a position detection control circuit 417. Thus, the scanning direction of a housing accommodating the photodetective section 402a is calculated for using a drive circuit 418 to make it scan space.

The best mode for a method for controlling the scanning by means of the position detection control circuit 417 will be described. If in the initial state, the housing accommodating the photodetective section 402a of the signal demodulating device 402 and the signal transmitting device 401 are not aligned at all, i.e., in the case where only one or two areas of the multi-divided photodetector 411 output a detection signal, the housing is made to scan such that a beam incidence spot moves diagonally with respect to the area of the multi-divided photodetector 411 on which the beam is incident. For example, in the case where the position detecting signal is detected only from a detection area (i) of the multi-divided photodetector 411 as shown in FIG. 7, the housing is moved so that the beam incidence spot moves towards a detection area (iii) of the multi-divided photodetector 411. In a case where the position detecting signal is detected from detection areas (i) and (ii) of the multi-divided photodetector 411, the housing is moved for scanning by control of the position detection control circuit 417 so that the beam incidence spot moves towards the detection areas (iii) and (iv) of the multi-divided photodetector 411.

Thus, by making the housing scan, the position detecting signal is detected from every detection area of the multi-divided photodetector 411. Thereafter, based on output signals from the respective detection areas (i)–(iv) of the multi-divided photodetector 411, the housing is made to scan space so that detector output signals from respective detection areas (i)–(iv) of the multi-divided photodetector 411 become equal to one another.

The wavefront alignment can be accomplished promptly and efficiently by using the above-mentioned control routine. In order to perform a stable control after the detection of the position detecting signal, the moving speed of the scanning system (scanning speed) needs to be slower compared with the response speed (100 kHz) of a control loop of the position detecting signal detecting system. Accordingly, the scanning speed is set to 10 kHz.

The spot size of a beam which is incident on the multi-divided photodetector 411 is preferably as large as that of one or two multi-divided detection areas. Here, since the response speed is restricted by the size of the detection area (i)–(iv), in order to detect the position detecting signal of frequency band of about 100 kHz, each multi-divided detection area (i)–(iv) is required to have a radius of approximately 2 to 3 mm.

An optimum value of the spot size of an incident beam on the detection face is obtainable when an incidence size is small. That is, when the lens 408 is positioned so as to be relatively in focus on the face of the detector 411, an angle of incidence at which the beam is incident on the lens 408 becomes large. As a result, the incident beam is likely to be out of the detection areas (i)–(iv) of the multi-divided photodetector 411. In other words, when the angular difference between the incident direction of the beam from the signal transmitting device 401 and the direction in which the signal demodulating device 402 point to is large, the wavefront alignment becomes impossible since the incident beam is out of the wavefront alignment loop.

On the other hand, when the size of the incident spot is larger than the size of the entire multi-divided photodetector 411, the multi-divided photodetector 411 always outputs a detection signal unless the position detecting signal beam is greatly divergent. However, along with reduction in the degree of change of the output signal with respect to the angular deviation, S/N ratio of the signal output with respect to the angle deteriorates. The wavefront alignment can not be precisely performed under such conditions. Accordingly, it is desirable that the proportion of the incident spot size to the size of the entire multi-divided photodetector 411 is small.

The present example uses a quartered detector as a multi-divided photodetector 411. However, another type of multi-divided photodetector, divided into areas other than four, may be placed in accordance with the spatial arrangement of the signal transmitting device 401 and the signal demodulating device 402.

On the other hand, the other part of the separated beam obtained by the optical demultiplexer 410 is optically coupled with the end face of the optical fiber 409. Especially, when the detection outputs from the respective detection areas (i) to (iv) of the multi-divided photodetector 411 are equal to one another, i.e., when the beam is incident at the center of the multi-divided photodetector 411, an optical arrangement is performed on the order of 1 μm so that the part of the separated beam obtained by the optical demultiplexer 410 is most efficiently coupled with the optical axis of the optical fiber 409.

After being guided to the optical fiber 409, the transmission signal beam is output in the air from the output end of the optical fiber 409. Then, the output beam is collimated by a lens 419. On the other hand, the locally oscillated beam is emitted in the air from the local oscillator laser 415 driven by the locally oscillated beam drive circuit 414 which modulates the frequency of the beam by means of a modulated signal based on the position detecting signal. The thus emitted locally oscillated beam is collimated by a lens 420. These collimated transmission signal beam and locally oscillated beam are mixed by the optical multiplexer 421 and received by the detector 422 so as to be subjected to a coherent detection.

The received signal passes through a high pass filter circuit 423, whereby noise components or the like are removed from the signal. Thereafter, the received signal is input to the signal demodulation circuit 424 so that the transmission signal is demodulated. The transmission signal can be demodulated by means of a delay detection, for example. The method for demodulating the transmission signal is not described in detail here, since it is not purport of the present invention.

The beam received by the detector 422 includes intensity-demodulated components which are position detecting signal components. The incident beam is coupled with the optical fiber 409 to some extent by means of a control by the multi-divided photodetector 411. Thereafter, the position detecting signal, included in the beam output from the end face of the optical fiber 409, is obtained via a band pass filter circuit 425. The position detection control circuit 417 is driven based on the thus obtained position detecting signal. Thus, the efficiency of subtle coupling between the incident beam and the optical fiber 409 can be improved compared with the case where the positioning is performed only based on the output from the multi-divided photodetector 411.

Furthermore, the output signal of the high pass filter circuit 423 is input to a wavelength tuning control circuit 426 through the signal demodulation circuit 424. In the wave length tuning control circuit 426, the light sources for the transmission beam and that for the locally oscillated beam have completely different oscillating frequencies in the initial state. Accordingly, the beat frequency resulting from the difference in oscillating frequency between these two lasers is extremely high. The change in such factors as a control for conforming these beam frequencies with each other or an environmental temperature of the locally oscillated beam light source, may vary the oscillating frequency, and then a beat signal frequency detected therefrom also may vary. Thus, a control loop for stabilizing the frequency of the beat signal is needed.

This control will be described in more detail. When the wavefront of the transmission signal beam and that of the locally oscillated beam are aligned, a wavefront alignment signal is output from the position detection control circuit 417. The wavelength tuning control circuit 426 drives the locally oscillated beam drive circuit 414 based on this signal so as to sweep the beam oscillation frequency of the locally oscillated beam. When the frequency of the transmission signal beam and that of the locally oscillated beam come close to some extent, the beat signal frequency is output from the detector 422. The control loop is arranged to drive the local oscillator laser 415 by the locally oscillated beam drive circuit 414 in such a way that this beat signal frequency becomes a desired frequency.

In order to stably perform the wave-length tuning, the wavelength during loop is required to operate during the wavefront alignment loop is in a stable condition. Accordingly, this wavelength tuning needs to have a control time period shorter than that of the wavefront alignment loop (10 kHz). Thus, the control time period is set to 500 kHz, in consideration of the fluctuation of beam frequency due to thermal effects.

By employing the method of the above-mentioned example, the spatial optical transmission of a beam of 100 Mbps can be carried out at a signal error rate of $10^{-9}$ or less, by means of wavefront alignment with a beam propagated across space and incident at a solid angle of 11°. Furthermore, according to this method, s beam transmitted in the air is coupled to the waveguide element. Thus, a heterodyne optical system can be structured in the free space by using optical components. This is suitable for making a precise optical system for wavefront alignment or the like, compared with the system in which this optical part is movable. The reason is that a heterodyne optical system can be structured where the beam is guided to a stable, non-movable optical section through the optical fiber 409. Moreover, one light source is provided on the transmitting side for modulating this beam frequency and sending the transmission signal data, while the intensity-modulated components work as a position detecting light source. Thus, unlike the case where two light sources (one for transmission and the other for position detection) are separately provided, there is no necessity to construct a large-scale complicated system using a mirror, such as a space spatial communication system or to control such a mirror.

In place of using a mirror for mixing beams, the transmission beam and the position detecting beam may be mixed using an optical multiplexer. However, use of a multiplexer like a beam splitter is not practical, since separation of the incident beam results in loss of transmitted beam components.

There is another method, in which the two light sources, i.e., a transmitting light source and a position detecting light source are located very close to each other. However, in light of the problem in the spatial arrangement of the optical system including a lens for an outgoing beam, they can not be closer to each other than 5 cm. For this reason, in order to make the angle of incidence on the detector 0.01° or less, the distance between these light sources in the signal transmitting device and the signal demodulating device have to be about 287 m or more. Namely, when providing this position detecting light source separately from the transmitting light source, the wavefront alignment for both the transmission signal beam and the position detecting beam is impossible, because an interval of 287 m or more is necessary. Thus, a configuration in which the signal transmission beam and the position detecting beam are emitted from one identical light source is of great advantage. In addition, this configuration allows the optical system to be more compact.

EXAMPLE 6

Figure 10:
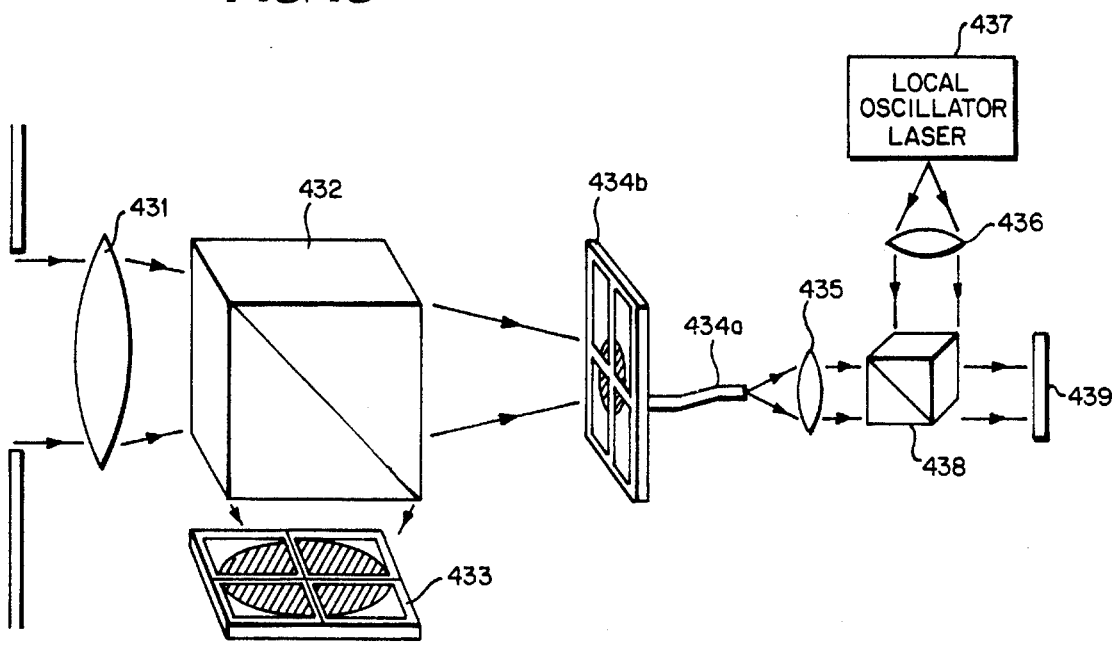
FIG. 10 is a schematic structural diagram showing a photodetective section of a spatial optical transmission apparatus of Example 5 of the present invention.
Figure 11:
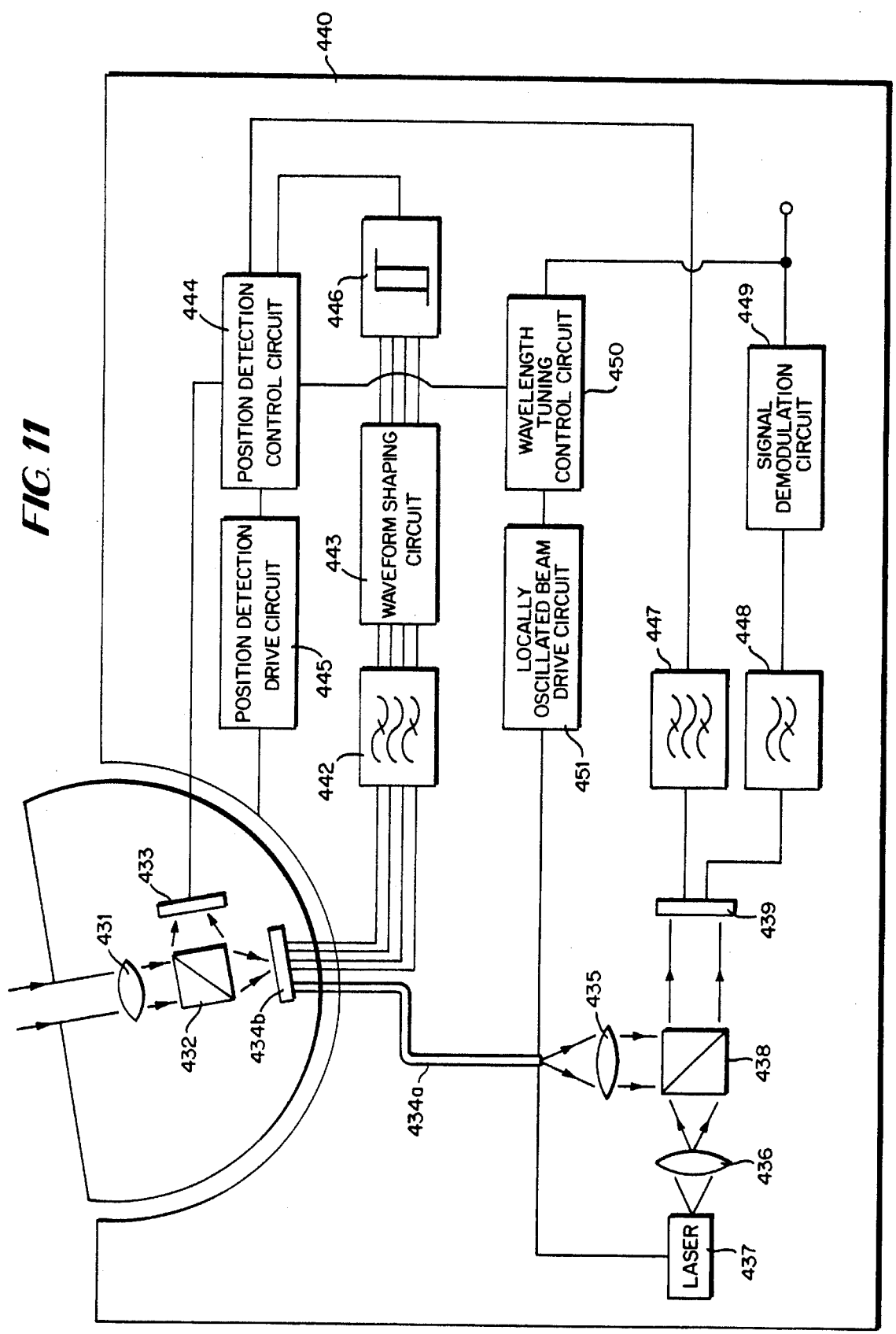
FIG. 11 is a block diagram showing the configuration of a signal demodulating device in which the photodetective section shown in FIG. 10 is incorporated.

FIG. 10 illustrates a schematic diagram showing a structure of a photodetective section of the spatial optical transmission apparatus according to Example 6 of the present invention. FIG. 11 illustrates a block diagram showing a signal demodulating device to which the photodetective section shown in FIG. 10 is incorporated.

The optical structure as shown in FIGS. 10 and 11 will be described. An area through which a signal beam enters the apparatus is limited by an aperture. The incident beam is collected by a lens 431, and then separated into two directions by an optical demultiplexer 432. One part of the separated beam is applied to a photodetective area on a multi-divided photodetector 433. The other part of the separated beam is incident on a photodetective area of a multi-divided photodetector 434b equipped with an optical fiber 434a as a waveguide path.

Components in the optical system are located such as lens 431, optical demultiplexer 452, multi-divided photodetectors 433 and 434b are located, in such a way that the distance between the multi-divided photodetector 433 end the optical demultiplexer 432 is made shorter than that between the multi-divided photodetector 434b and the optical demultiplexer 432, for making the size of a beam spot of the signal beam incident on the multi-divided photodetector 433 without an optical fiber larger than that incident on the multi-divided photodetector 434b with the optical fiber 434a. Then, components such as the lens 431 are located so that the coupling efficiency at one end face of the optical fiber 434a becomes large when all the detection output signals of respective detection areas of the multi-divided photodetector 433 are equal to one another, i.e., when the signal beam is collected and incident on the central portion of the multi-divided photodetector 433.

This optical fiber 434a is arranged so that its one end face is coupled to the central portion of the detection area of the multi-divided photodetector 434b. The signal beam entering from one end face of the optical fiber 434a is output at a certain position in the other end face. This output signal beam is collimated by a lens 435. This collimated beam and a locally oscillated beam emitted from a local oscillator laser 437 and collimated via a lens 436, are mimed by an optical multiplexer 438. The mixed beam is received by a detector 439 so as to be subjected to a coherent detection.

Figure 12A:
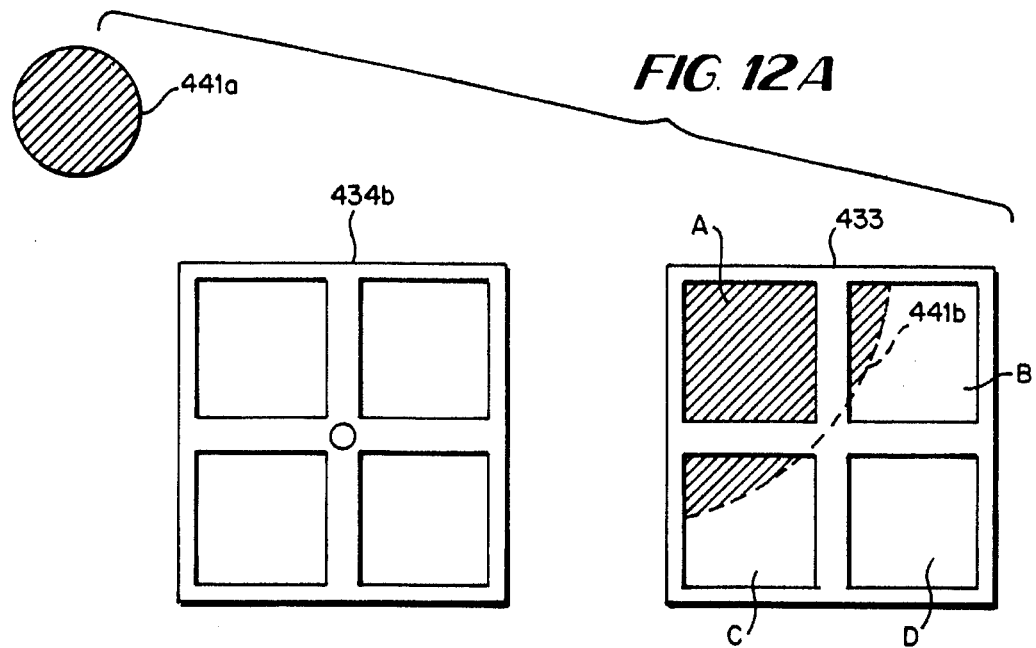
FIG. 12A is a diagram showing a positional relationship between multi-divided detectors and a beam spot in a case where the beam spot is considerably out of place, according to the present invention.

The optical system thus arranged makes it possible to have a large solid angle for wavefront alignment with an incident beam from the air. That is, in the case where there is a great relatively positional deviation between a signal transmitting device (not shown) and the signal demodulating device 440 when a transmission beam from the signal transmitting device is incident on a signal demodulating device 440, the beam converging spot 441a of the position detecting signal beam is away from the multi-divided photodetector 434b if a beam converging spot 441a of the position detecting signal beam on the multi-divided photodetector 434b is small as shown in FIG. 12A. However, in the case where a beam converging spot 441b of the position detecting signal beam with which the multidivided photodetector 433 is irradiated is large, the converging beam spot 443b is formed within the multi-divided photodetector 433 even if there is somewhat large deviation between two devices.

Figure 13:
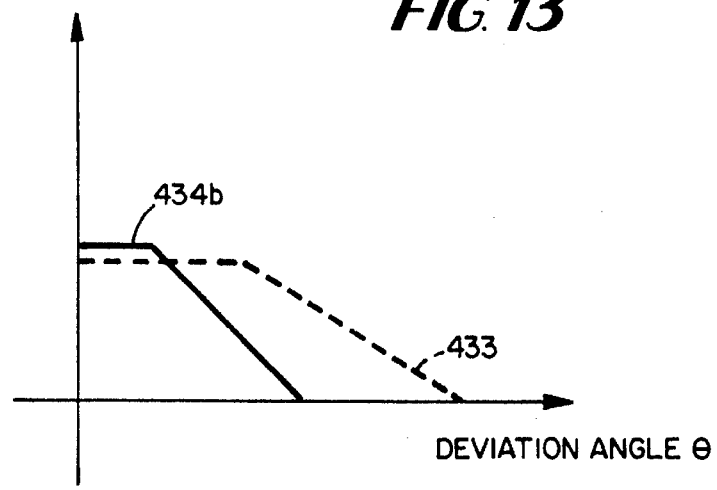
FIG. 13 is a diagram showing the relationship between a deviation angle (an incident angle) θ and the sum of outputs of the respective unit detectors of the multi-divided photodetector of the present invention.

FIG. 13 shows the relationship between an incident angle θ (deviation angle) of the position detecting signal beam to the signal demodulating device 440 and sum of output signals of the respective unit detectors of the multi-divided photodetector 433. As shown in FIG. 13, in the case of the multi-divided photodetector 433, the degree of change of an output value with respect to the incident angle e is small, since the beam spot size on the face of the photodetector is large. This decreases the S/N ratio of the output signal with respect to the deviation angle θ, which reduces controllability of the wavefront alignment. However, the capacity of an angle at which the wavefront alignment function is effective becomes larger. On the other hand, in the case of the multi-divided photodetector 434b, the degree of change of an output value with respect to the incident angle θ is large because of a small beam spot size. This makes it possible to take a large S/N ratio of the output signal with respect to the deviation angle θ, which results in improvement of controllability of the wavefront alignment. In contrast with the case of the multi-divided photodetector 433, the capacity of an angle at which the wavefront alignment function is effective is reduced.

Figure 12B:
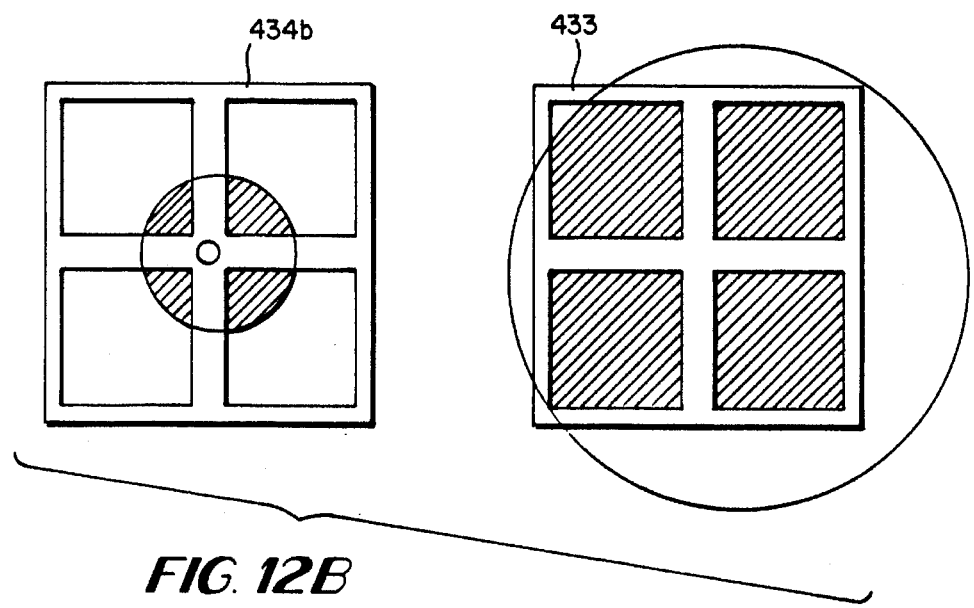
FIG. 12B is a diagram showing a case where the beam spot is in place, according to the present invention.

However, by combining these two multi-divided photodetectors 433 and 434b, the large capacity of an angle assuring an effective wave front alignment and the superior wavefront alignment controllability are realized at the same time. For example, when there is a large angular deviation between the incident direction of the position detecting beam and the direction in which the signal demodulating device 440 points to as shown in FIG. 12A, the position detecting signal is detected from an area a and from areas B and C of the multi-divided photodetector 433 only in a small amount. The position detecting signal is not detected from the multi-divided photodetector 434b. In this case, signal in this state is supplied from the multi-divided photodetector 434b via a band pass filter 442 and a waveform shaping circuit 443 to a position detection control circuit 444. Meanwhile, the signal detected from each detection area of the multi-divided photodetector 433 is supplied to The position detection control circuit 444, so that the position detection drive circuit 445 is controlled by The position detection control circuit 444 to drive a signal detecting optical system for scanning by the detected signal, together with the housing. After detecting the output signal of the multi-divided photodetector 434b indicating that the beam spot is formed at the central portion of the detection area of the multi-divided photodetector 434b as shown in FIG. 12B, the position detection control circuit 444 is switched into such a control loop that renders output signals of respective unit areas of the multi-divided photodetector 434b equal to one another. Namely, via the band pass filter 442, the output signal from the multi-divided photodetector 434b is amplified by the waveform shaping circuit 443 up to an arbitrary level. The amplified signal is compared by a comparator 446 and then, such a direction that renders detection output signals from all The detective areas of the multi-divided photodetector 434b equal to one another is calculated by the position detection control circuit 444. Thereafter, the signal detecting optical system is driven, together with the housing, by a position detection drive circuit 445.

The size of a beam spot on the plurality of detection areas of the multi-divided photodetector 433 and 434b is changed in this way, which assures the wavefront alignment with a signal beam incident at a larger solid angle of 30°. As a result, an optical spatial transmission of 100 Mbps can be performed at a signal error rate of $10^{-9}$.

Here, a locally oscillated beam emitted from the local oscillator laser 43 and passed through a lens 436 and a transmission signal beam output from an end face of the optical fiber 434a and passed through a lens 435 are mixed by an optical multiplexer 438 and received by a light receiving element 439. From the received beam, the position detecting signal is extracted by a band pass filter 447 and input to the position detection control circuit 444. A control loop similar to that of Example 3 is used for this process. Meanwhile, a beat signal is extracted from the output signal from the light receiving element 439 by means of a high pass filter 448, so that the signal can be demodulated by a signal demodulation circuit 449. An output signal of the signal demodulation circuit 449 is input to a wavelength tuning control circuit 450, for driving the local oscillator laser 437 via the locally oscillated beam drive circuit 451. A control loop similar to that of Example 3 is used for this wavelength tuning process.

FIGS. 14A to 14H are sectional views showing respective steps of a method for fabricating the multi-divided photodetector 434b shown in FIG. 10. As shown in FIG. 14A, an $SiO_2$ film 462 is formed by thermal oxidation using a $p^-$-Si substrate 461. After application of a resist, the $SiO_2$ film except for a part to be the photodetector is removed by a photolithography process of BHF (backward hydrofluoric), whereby a mask as shown in FIG. 14B is formed. Next, by using the mask, the substrate 461 is etched into a cross-sectional shape shown in FIG. 14C.

Then, on the surface thereof, an $SiO_2$ film 463 is formed again by thermal oxidations. Furthermore, us shown in FIG. 14D, a part of the $SiO_2$ film on a projecting portion to be the photodetector is removed, and en $n^+$ layer 464 is formed to a depth of 0.3 μm or less by diffusion or ion implantation. Thereafter, a resist is applied the recess portion centered on the projecting portion to be the photodetector, and a tapered window for fitting an optical fiber is formed by a photolithography process. A part of the $SiO_2$ film on this window portion is removed by BHF.

Then, as shown in FIG. 14E, a tapered guide hole 465 is formed by selective etching using an aqueous solution of EPW (ethylene diamine pyrocatechol). Following this, as shown in FIG. 14F, a $p^+$ layer 466 is formed on the rear side of the substrate 461 by diffusion or ion implantation. Then, as shown in FIG. 14G, electrodes 467 and 468 are disposed on the surfaces of $p^+$ layer 466 and $n^+$ layer 464, respectively. Moreover, an antireflection coating 469 is applied onto each of beam incidence portions on the $n^+$ layer 464 for improving photoelectron conversion efficiency. Then, as shown in FIG. 14H, one end face of the optical fiber 434a is fit into the tapered guide hole 465 from the rear side of the substrate 461. Thereafter, the optical fiber 434a is fixed to the rear side of the substrate 461 with UV cured resin 470. Thus, the optical fiber 434a and the multi-divided photodetector 434b are integrated into one unit.

Integration of the optical fiber 434a and the multi-divided photodetector 434b allows the optical parts of the signal demodulating device 470 to be more compact and stabler.

Figure 15:
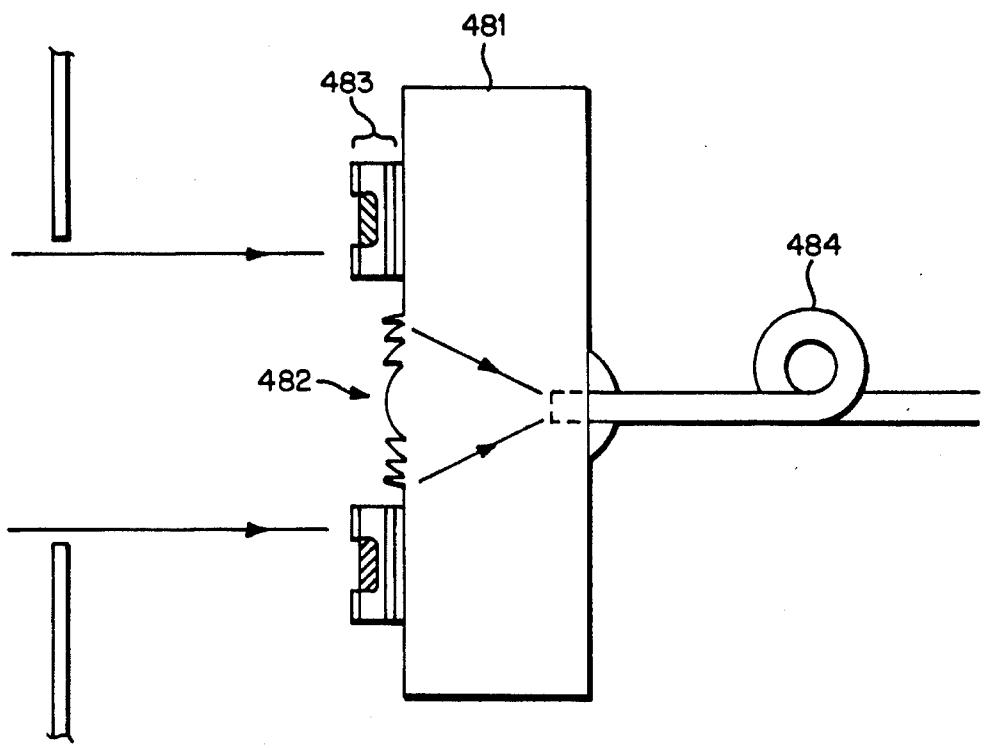
FIG. 15 is a cross sectional view of a multi-divided photodetector and an optical fiber of one modification of the signal demodulating device shown in FIG. 11.

FIG. 15 illustrates a cross-sectional view showing another modification of the optical fiber 434a and the multi-divided photodetector 434b in the signal demodulating device as shown in FIG. 11.

According to this modification, a substrate 481 of the multi-divided photodetector is made of a glass (e.g., BK7) which may be used as a material of an optical glass. In the surface part of the substrate, a Fresnel lens 482 is formed by ion beam etching or RIE (reactive ion etching). Since light sources for a transmission signal beam and a position detecting beam are of a frequency band of 0.78 μm as a position detecting beam detector, four detectors 483 mode of Si (silicon) are attached at predetermined positions on the substrate 481, with an adhesive or the like. Though the present example has four Si detecting units 483 arranged in the form of the corners of a square, a larger number of detecting units 483 may be provided. The numerical number (NA) of the Fresnel lens 482 has to be equal to that of the optical fiber 484. The substrate 481 has a guide groove in its rear side for guiding the optical fiber 484 so that an incidence end face thereof is located at the focal point of the Fresnel lens 482 formed in its front side. By inserting the incidence end face of the optical fiber 484 into this guide groove, the optical fiber 484 and the rear side of the substrate 481 are fixed with each other.

Thus, the Fresnel lens 482, the optical fiber 484 and the photodetector 483 are all integrated into one unit. This allows the optical system to be stabilized, consisted of a less number of members, and is operable with a smaller amount of positioning operation.

Figure 16A:
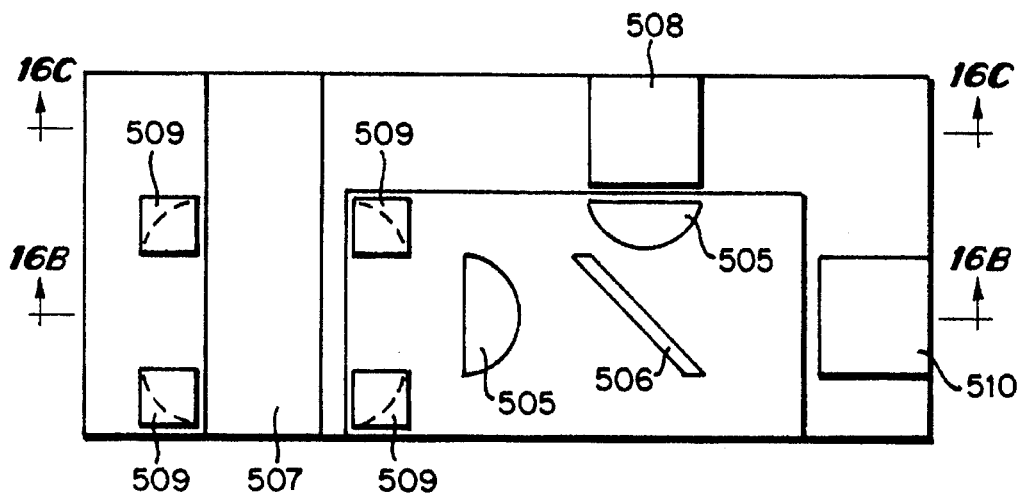
FIG. 16A is a plan view showing one modification of the photodetective section of the signal demodulating device shown in FIG. 11.
Figure 16B:
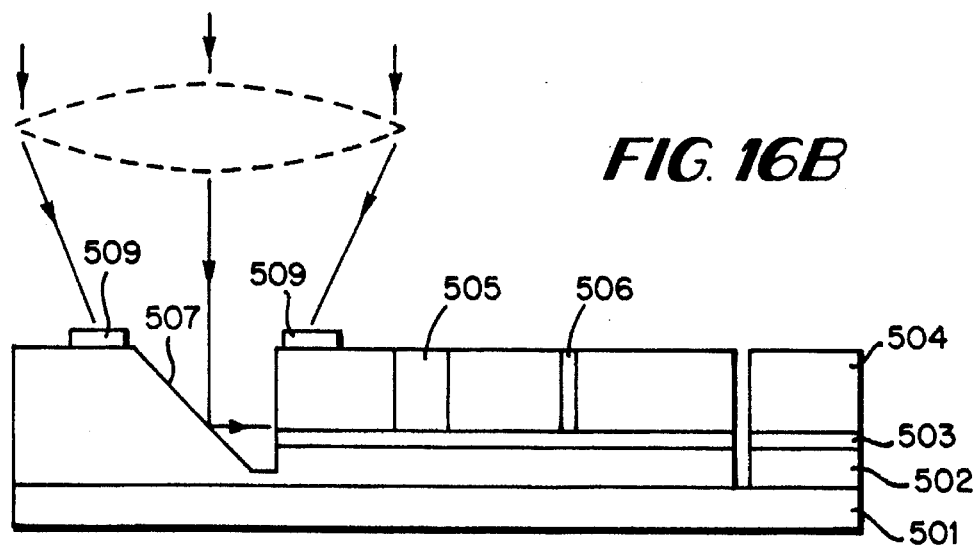
FIG. 16B is a cross sectional view taken along line A—A' in FIG. 16A.
Figure 16C:
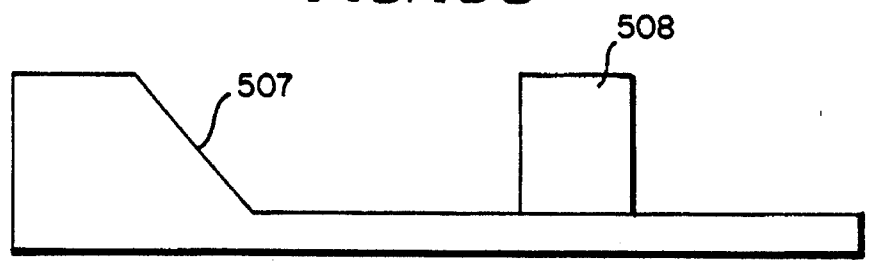
FIG. 16C is a cross sectional view taken along line B—B' in FIG. 16A.

FIGS. 16A to 16C show still another modification of the photodetective section of the signal demodulating device shown in FIG. 11. FIG. 16A shows a plan view of the same, FIG. 16B shows a cross sectional view taken along line A—A', and FIG. 16C shows a cross sectional view taken along line B—B'. The configuration shown in FIGS. 16A to 16C uses a beam having a wavelength of 1.3 μm both for the signal transmission beam and the position detecting signal beam.

There is provided an optical waveguide structure consisting of a lower clad layer 502, a core layer 503 and an upper clad layer 504 which are grown on an InP substrate 501 by the MOCVD (metal organic chemical vapor deposition) method. The lower clad layer 502 is an InP layer (thickness: 3 μm). The core layer 503 is an $In_xGa_{1-x}As_yP_{1-y}$ layer (thickness: 1 μm) having a wavelength of 1.3 μm and lattice-matching with the InP substrate 501. The upper clad layer 504 is an InP layer (thickness: 3 μm). Here, in order to make the coupling efficiency with the air as large as possible, the thickness of the core layer 503 is large in such a manner that any coupling loss due to the core layer's butt joint with the locally oscillated beam light source is kept small and yet the core layer is available as a single mode waveguide path. The thickness of the core layer 503 is determined in this manner, and differences in refractive index between the core layer 503 and the clad layer 502 and between the core layer 503 and the clad layer 504 are also adjusted for this purpose. Here, the thickness and refractive index of the core layer 503 may vary in the direction of optical waveguide so that the core radius may be about 1 μm at the junction part with the laser for providing conformity of the core layer 503 and the laser in an N.F.P (near field pattern), and so that it may be large at the Junction part with the air for achieving a large coupling efficiency with an incident beam from the air.

Next, a method for fabricating this photodetective section is briefly described.

First, an SiNx layer mask is formed by P-CVD or the like, end a resist is applied. After forming patterns of a lens 505 and a beam splitter 506 serving as an optical multiplexer, by a photolithography process, an InP layer of the upper clad layer 504 is removed by etching. Thereafter, an $In_xGa_{1-x}As_yP_{1-y}$ layer having a refractive index larger than that of the removed layer and lattice-matching with the InP substrate is buried by selective growth of MOCVD. This effectively changes an equivalent refractive index, which allows a lens shape serving as a lens to be formed. Similarly, the beam splitter can be formed by burying an $In_xGa_{1-x}As_yP_{1-y}$ layer having a refractive index smaller than that of the removed layer and lattice-matching with the InP substrate.

Thereafter, an SiNx layer mask is formed again and a photoresist is applied thereto. Thus, there are provided patterns for formation of a 45° mirror 507, a local oscillator laser 508 as a locally oscillated beam light source and photodetectors 509. After the mirror 507 and the substrate 501 are etched by a dry etching process like RIB (reactive ion etching) or a wet etching process, the local oscillator laser 508, a signal beam detector 510 and the photodetectors 509 constituting a multi-divided photodetector are affixed at predetermined positions.

In the present example, the local oscillator laser 508 and the photodetectors 509 are affixed to the substrate 501. Alternatively, the local oscillator laser 508 and the photodetectors 509 may be formed being partially buried in the substrate 501 by using a selective growth method, which results in improvement of the positional accuracy. Moreover, the position at which the waveguide coupling lens 505 is secured is determined so that the focal point coincides with the end face of the waveguide path. For example, in the case of using a lens having a focal length of 20 mm, a lens radius of 10 mm and a numerical aperture of about 0.25, the optical coupling efficiency with a semiconductor laser having an ordinary F.F.P (far field pattern) of about 30° can be large.

A stable optical system without disturbance can be obtained by performing the wavefront alignment using the thus configured optical waveguide structure.

Figure 17A:
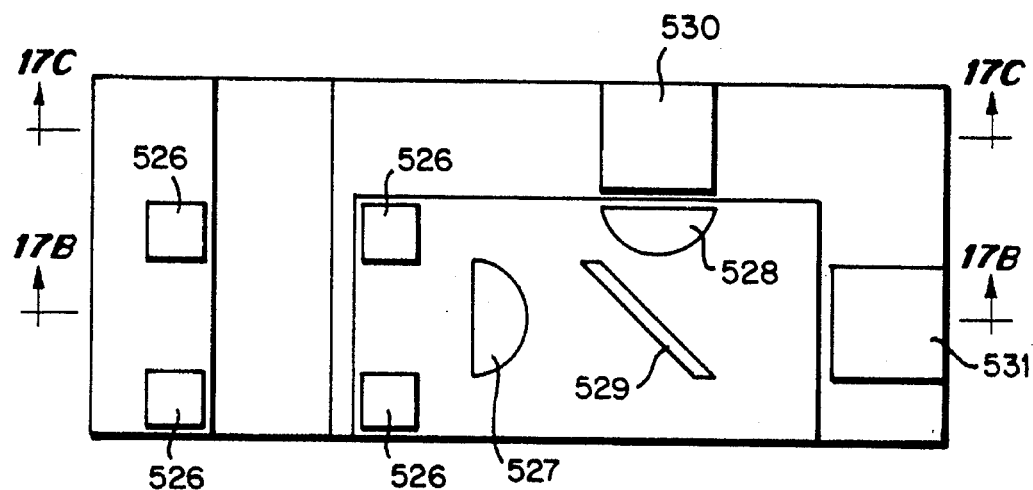
FIG. 17A is a plan view showing another modification of the photodetective section of the signal demodulating device as shown in FIGS. 16A–16C.
Figure 17B:
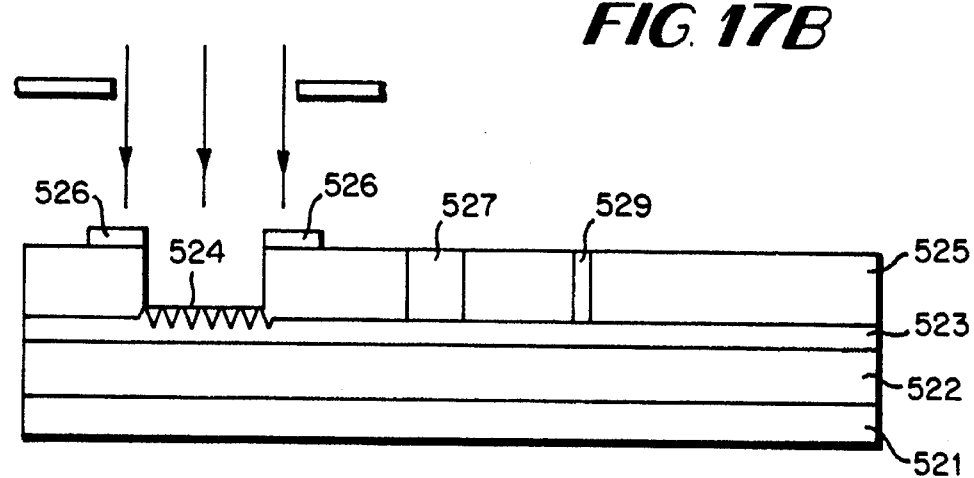
FIG. 17B is a cross sectional view taken along line C—C' in FIG. 17A.
Figure 17C:
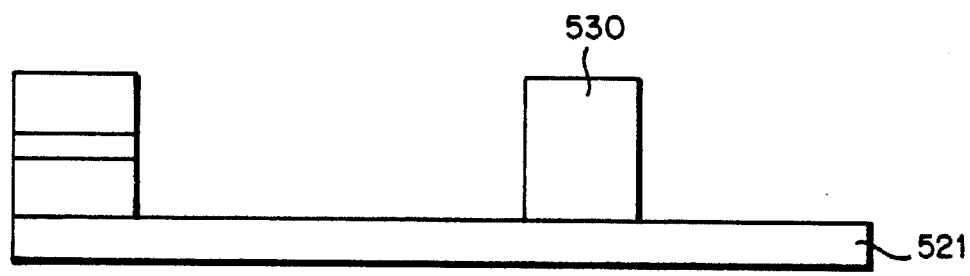
FIG. 17C is a cross sectional view taken along line D—D' in FIG. 17A.

FIGS. 17A to 17C show a modification of the photodetective section of the signal demodulating device as shown in FIGS. 16A to 16C. FIG. 17A illustrates a plan view showing the same, FIG. 17B illustrates a cross sectional view taken along line C—C', and FIG. 17C illustrates a cross sectional view taken along line D—D'. The configuration as shown in FIGS. 17A to 17C use a beam having a wavelength of 0.78 μm both for the signal transmission beam and the position detecting signal beam.

After forming an $Al_yGa_{1-y}As$ layer (Y=0.13, thickness of layer: 0.5 μm) as a lower clad layer 522 by using a GaAs substrate 521 for providing a photodetector, a secondary grating 524 is formed on the lower clad layer 522 at a part of an optical waveguide 523 which will be a light incidence portion. This grating is formed by an electron beam plotting and a dry etching process, and the pitch thereof is 220 nm. By means of the grating 524, a beam incident from above can be coupled with the optical waveguide 523.

Thereafter, as an upper clad layer 525, an $Al_xGa_{1-x}As$ layer (X=0.3, thickness of layer: 3 μm) is formed on the optical waveguide 523. A part of the upper clad layer 525 is removed by etching, so as to form an incidence window above the secondary grating 524. In the vicinity of the incidence window, four photodetectors 526 constituting a multi-divided photodetector for a position detecting signal beam are mounted in the form of the corners of a square. Lenses 527 and 528, an optical multiplexer 529 which is a beam splitter, e local oscillator laser 530, and a signal beam detector 531 are formed through procedures as described in connection with FIGS. 16A to 16C.

This configuration does not necessitate a lens for collecting light to be incident on the optical waveguide 523 or the positioning of such a lens. This results in a more compact optical system, which can be assembled through a less complicated process.

Figure 18A:
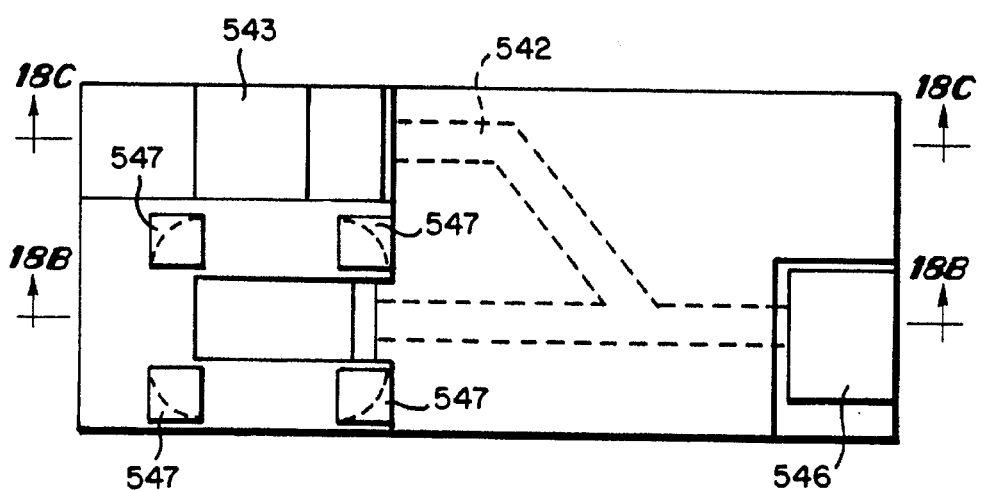
FIG. 18A is a plan view showing still another modification of the photodetective section of the signal demodulating device as shown in FIGS. 16A–16C.
Figure 18B:
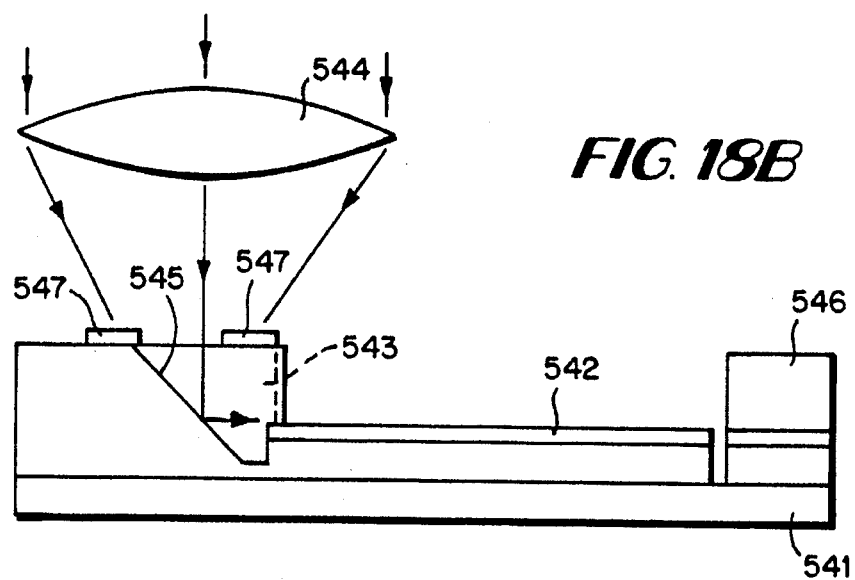
FIG. 18B is a cross sectional view taken along line E—E' in FIG. 18A.
Figure 18C:
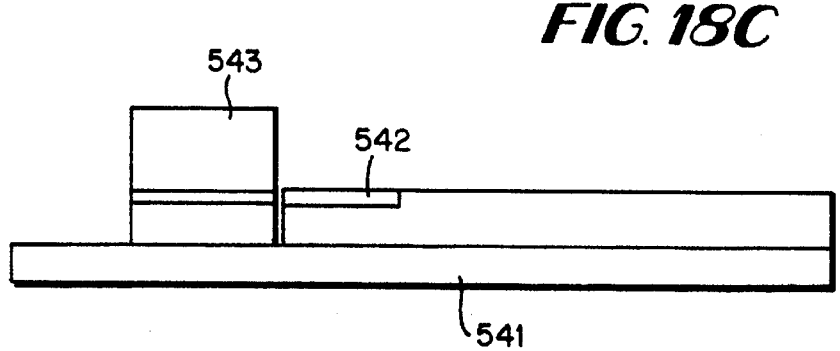
FIG. 18C is a cross sectional view taken along line F—F' in FIG. 18A.

FIGS. 18A to 18C show another modification of the photodetective section of the signal demodulating device as shown in FIGS. 16A to 16C. FIG. 18A illustrates a plan view showing the same, FIG. 18B illustrates a cross sectional view taken along line E—E', and FIG. 18C illustrates a cross sectional view taken along line F—F'.

The configuration as shown in FIGS. 18A to 18C uses an $LiNbO_3$ substrate 541 as an optical waveguide substrate, whereby forming a three-dimensional optical waveguide path 542 by thermal diffusion of Ti. This three-dimensional optical waveguide path 542 has a Y-shaped waveguide path. A local oscillator laser 543 is mounted at a position which enables a locally oscillated beam to be incident through one of two branches of the Y-shape path. The size of a beam spot on the three-dimensional optical waveguide path 542 should coincide with an N.F.P (near field pattern) of the local oscillator laser 543, in order to have a large coupling efficiency. On the other hand, a beam propagated in the air is guided through the other branch of the Y-shape path. The guided beam is collected by a lens 544 and then is incident on the three-dimensional optical waveguide path 542 by a 45° mirror 545. These beams are mixed by the Y-shaped optical waveguide path 542 so as to be subjected to detection by a signal beam detecting element 546. Four photodetectors 547 for the position detecting signal beam are adhered onto the substrate 541 in the vicinity of the 45° mirror 545, in such a manner that the 45° mirror 545 is sandwiched between two linearly arranged photodetectors. The signal processing section of the signal demodulating device and the like has a configuration similar to that shown in FIG. 8.

The Y-shaped optical waveguide path structure is advantageous in that there is no necessity of forming a lens and a beam splitter in and on a semiconductor by using an etching process and a step utilizing an MOCVD regrowth technique. This contributes to simplification of the fabricating procedure. In fabricating the three-dimensional optical waveguide path, a proton exchange technique or the like may be used, apart from a method of Ti diffusion towards the $LiNbO_3$ substrate 541 as described in the present example.

Figure 19:
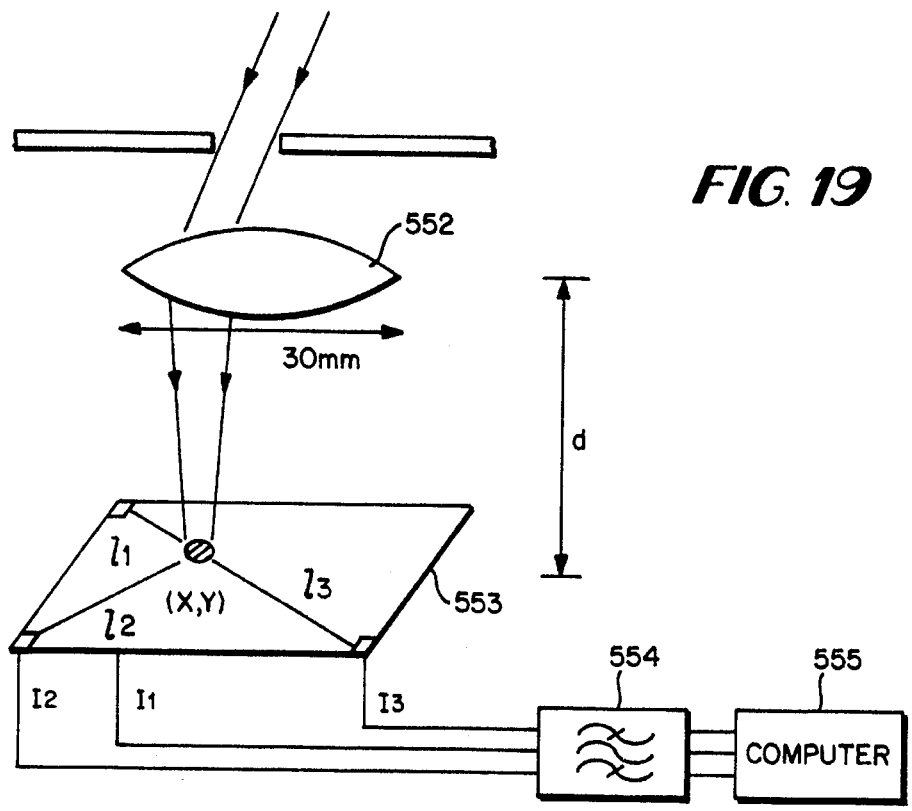
FIG. 19 is a partial structure1 diagram showing another example of the photodetective section of the signal demodulating device.
Figure 20:
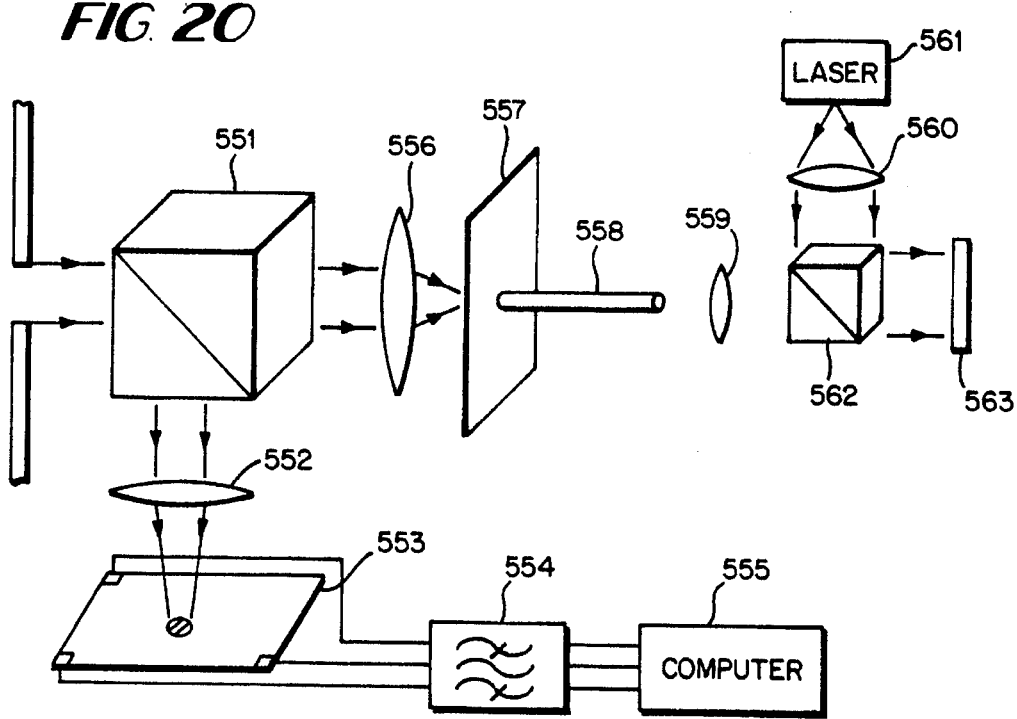
FIG. 20 is a structural diagram showing another example of the photodetective section of the signal demodulating device.

FIG. 19 illustrates a partial structural diagram showing another modification of the photodetective section of the signal demodulating device according to the present invention. FIG. 20 illustrates a structural diagram showing the example.

As shown in FIGS. 19 and 20, the optical configuration of the photodetective section is made so that an area through which an incident beam enters is limited by an aperture and the incident beam is split by a beam splitter 551 into two parts, one of which is incident on a lens 552 and then guided to a detector 553. Herein, a distance a between the lens 552 and the detector 553 is arranged to be equal to the focal length of the lens 552. In the thus arranged optical configuration, a position detecting signal beam incident at a different incidence angle will form a beam spot at a different position on the surface of the detector 553. For instance, in the case of using a lens having an effective area of 30 mm² and a focal length of d=20 mm as the lens 552, in which the numerical aperture NA is set to 0.12, the wavefront alignment function is effective for a beam incident from the air at an incidence angle of 14° or less. The wavefront alignment function angle of 0.01° or less is necessary for coherent detection, though it may change depending on the size of the detector 553. The spatial resolving ability on the surface of the detector 553 at this angle is approximately 20 μm. Accordingly, in this optical configuration, the wavefront alignment is possible if the detector has a position detecting spatial resolving ability for a radius of 20 μm.

The detector 553 has three electrodes respectively disposed at its corner portions. A photoelectric current occurring at the beam incidence spot is inversely proportional to respective distances to the electrodes. A divided current is taken from each of the electrodes. Accordingly, these output currents ($I_1$, $I_2$, $I_3$) are expressed as follows:

$$I_1 = \frac{l_2 l_3}{l_1 l_2 + l_2 l_3 + l_3 l_1} I_0$$

$$I_2 = \frac{l_1 l_3}{l_1 l_2 + l_2 l_3 + l_3 l_1} I_0$$

$$I_3 = \frac{l_1 l_2}{l_1 l_2 + l_2 l_3 + l_3 l_1} I_0$$

In the above equations, $I_1$, $I_2$ and $I_3$ respectively denote a distance from a beam spot to each electrode. $I_0$ denotes a photovoltaic occurring due to the beam incidence. The position of the beam incidence spot (X, Y) can be calculated from these three equations.

These output currents ($I_1$, $I_2$, $I_3$) are passed through a band pass filter circuit 554 to obtain a position detecting signal. The beam incidence position (X, Y) is calculated by a computer 555 in accordance with the above three equations. Based on these signals, the photodetective section of the signal demodulating device is driven to scan space so as to be aligned with the incidence direction of the transmission signal beam.

As shown in FIG. 20, this photodetective section has a configuration in which the other of the incidence beam split by the beam splitter 551 is collected by a lens 556 on an optical fiber 558 disposed at the central portion of a multi-divided detector A beam output from the other end of the optical fiber 558 is collimated by a lens 559. Then, by an optical multiplexer 562, the collimated beam is mixed with a locally oscillated beam emitted from the local oscillator laser 561 and transmitted through e lens 560. The signal is received by a receiving device 563 so as to be demodulated. In this way, more precise control becomes possible by using the optical fiber 558 equipped with the multi-divided detector 557.

Accordingly, thus configured optical system is capable of precisely and rapidly detecting an approximate incidence direction of the incident beam. This allows the system to perform the wavefront alignment at a high speed.

EXAMPLE 7

Figure 21:
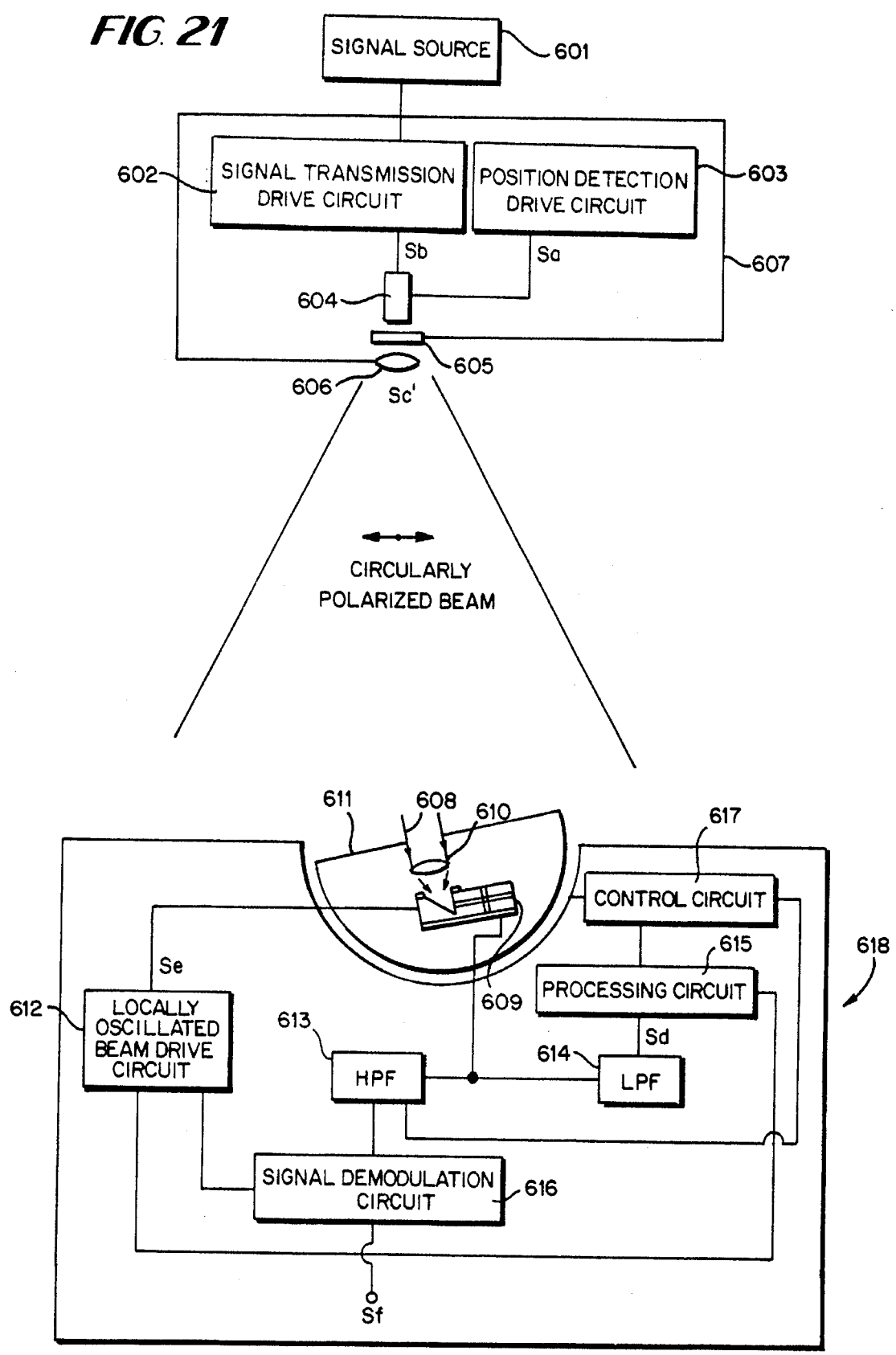
FIG. 21 is a block diagram showing a spatial optical transmission apparatus of Example 7 of the present invention.
Figure 23:
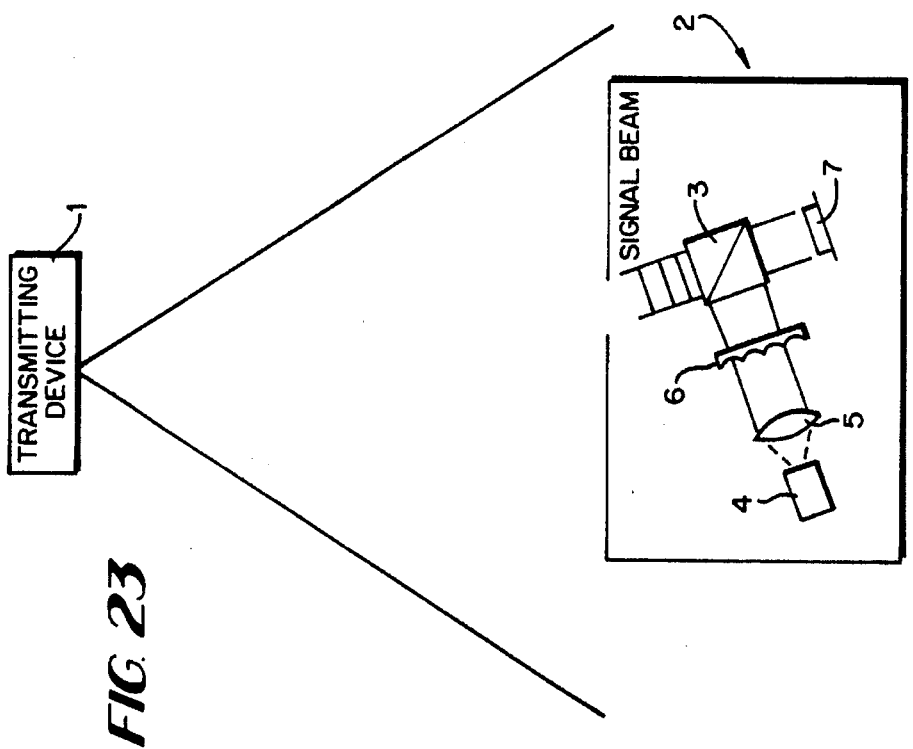
FIG. 23 is a block diagram showing a space optical transmission apparatus using a known technique using a diffused locally oscillated beam.
Figure 22:
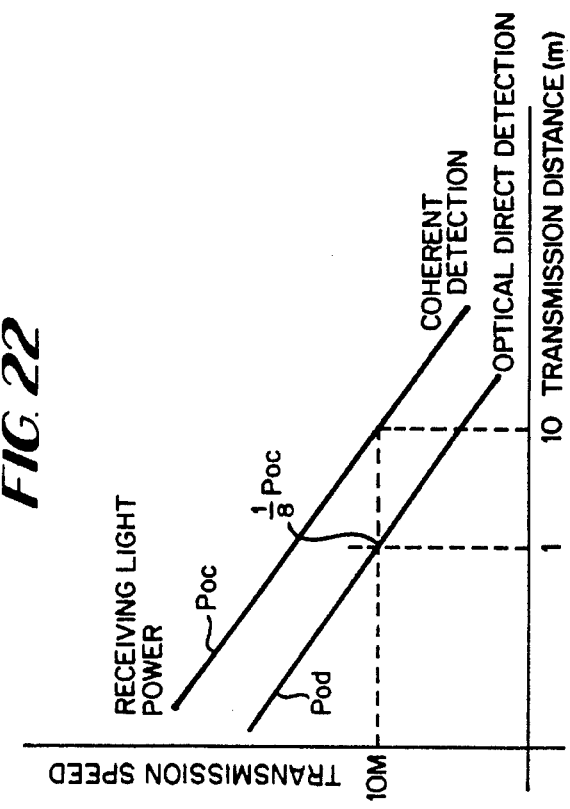
FIG. 22 is a graph showing characteristics of a spatial optical transmission method.
Figure 24:
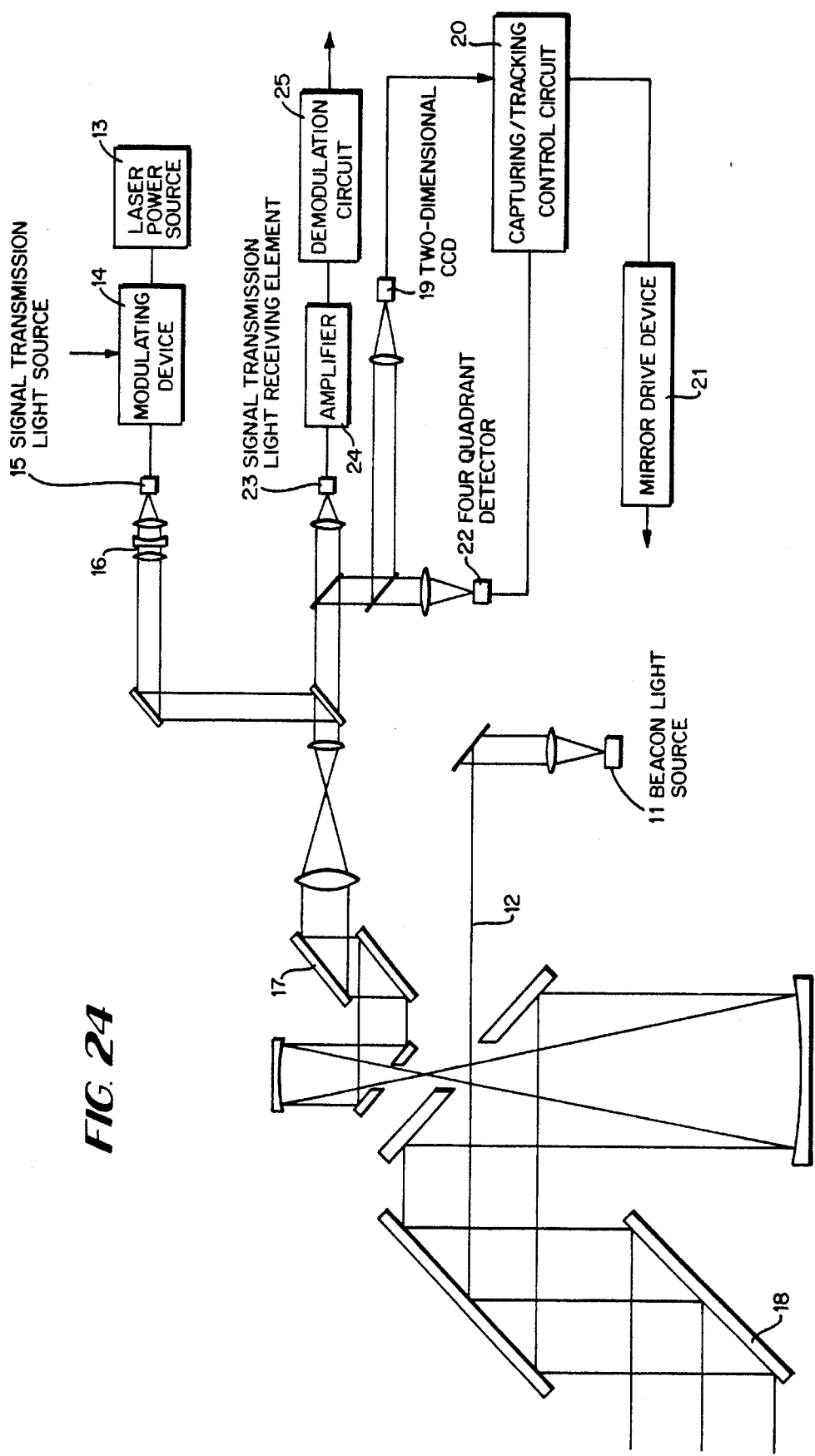
FIG. 24 is a block diagram showing a space optical transmission apparatus.
Figure 25A:
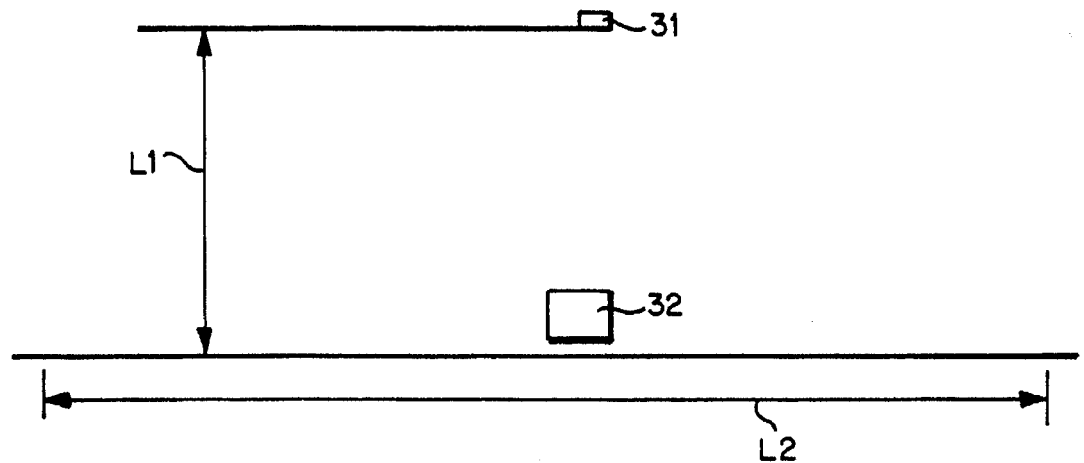
FIGS. 25A and 25B are schematic diagrams showing a signal transmitting device and a signal demodulating device of another conventional space optical transmission apparatus.
Figure 25B:
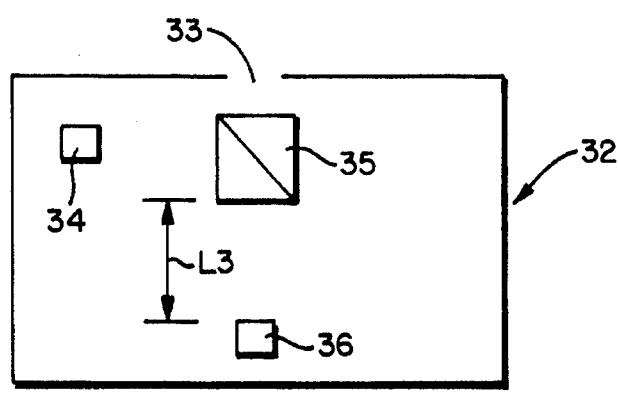

FIG. 21 illustrates a block diagram showing a spatial optical transmission apparatus according to Example 7 of the present invention.

In FIG. 21, on the light signal transmission side, a signal source 601 is connected to a signal drive circuit 602 to input a transmission signal. The signal drive circuit 602 and the position detection drive circuit 603 are connected to a semiconductor laser 604 functioning as a transmission beam source. In the semiconductor laser 604, a signal beam Sc is obtained by intensity-modulating a transmission signal Sb from the loop arranged to drive the signal drive circuit 602 with a sufficiently low speed (e.g., 10 kbs) compared with the transmission speed of the signal Sb and in accordance with code series Sa from the position detection drive circuit 603. A quarterwave plate 605 and a lens 606 are disposed in front of the semiconductor laser 604. The signal beam Sc from the semiconductor laser 604 is passed through the quarter-wave plate 605, whereby a signal beam Sc' having transmission signal components with its plane of polarization being a circularly polarized beam is output in the air. The above-mentioned signal drive circuit 602, position detection drive circuit 603, semiconductor laser 604, quarter-wave plate 605 and lens 606 constitute a signal transmitting device 607.

On the signal receiving side, a lens 610 is provided for guiding a signal beam incident through aperture limiting portion 608 to an incidence portion of an optical waveguide path device 609. The optical waveguide path device 609 and the lens 610 are accommodated inside a housing 611 of the signal detecting section. A coherent heterodyne detection is performed inside the optical waveguide path device 609, by using a locally oscillated beam from a locally oscillated beam drive circuit 612. The optical waveguide path device 609 is connected to the locally oscillated beam drive circuit 612. The output end of its photodetector is connected to a high pass filter 613 and a low pass filter 614. The circularly polarized signal beam SC' is detected by the signal detector of the optical waveguide path device 609 and input to the high pass filter 613 and the low pass filter 614. The locally oscillated beam drive circuit 612 is connected to a processing circuit 615 and a demodulation circuit 616. Furthermore, the high pass filter 613 is connected to the demodulation circuit 616 and a control circuit 617. Through the high pass filter 613, the signal is demodulated by the demodulation circuit 616. Meanwhile, the position detecting signal from the high pass filter 613 is input to the control circuit 617. The housing 611 is driven and controlled via the control circuit 617 in such a manner that the signal intensity components of the signal become the maximum signal intensity. In this way, a spatial position to which the aperture limiting portion 608 of the housing 611 points is driven and controlled. The low pass filter 614 is connected to the processing circuit 615. The processing circuit 615 and the control circuit 617 are not connected with each other, since alignment of the plane of polarization is not required. An optical demodulating device 618 consists of these elements.

The functions of the above-mentioned structure will be described.

In the case where a semiconductor laser is used as a transmitting light source of the light signal transmitting device, a beam transmitted therefrom is typically a linearly polarized beam. This is because a TE (Transverse Electric) mode is selected as an oscillation mode of the semiconductor laser. In the case of a Fabry-Perot laser, this selectivity is attributable to the fact that the end face reflectance is higher in the TE mode than in TM (Transverse Magnetic) mode, which results in a lower threshold gain. A similar phenomenon arises also in the case of a DFB laser, wherein the oscillation mode is selected based on the value of a coupling constant κ different in each of the modes. The use of a semiconductor laser is advantageous in that the device can be small-sized. However, in the case of performing a coherent optical detection, since an output beam of the semiconductor laser is a linearly polarized beam, the alignment of the plane of polarization is required in addition to tuning of the oscillating wavelength.

This problem is solved by an arrangement such that a quarter-wave plate 605 is inserted in the output portion of the semiconductor laser 604 serving as a signal beam light source of the signal transmitting device 607 for converting the output beam into a circularly polarized beam before being output in the air. This eliminates the necessity of the alignment of plane of polarization. The thus arranged light signal demodulating device 618 has, for example, an optical waveguide path device 609 equivalent to the optical waveguide path device as shown in FIGS. 16A to 16C.

Herein, the light signal demodulating device 618 is controlled so that the signal beam is coupled with the optical waveguide path device 609 based on the intensity components (position detecting signal) from the light signal transmitting device 607. The beam coupled with the waveguide path of the optical waveguide path device 609 is propagated in the waveguide path, and then caused to coincide with a local oscillator beam laser oscillated e.g., in the TE mode. Thus, a beat signal is detected. The beat signal detected at this time is obtainable only from two lasers in the same mode. That is, the beat signal is obtained only from the components corresponding to TE mode, included in the signal beam transmitted as a circularly polarized beam. This results in a loss of 3 db with respect to the entire power of the transmission signal.

However, a stable signal detection is always ensured, even if the plane of polarization is changed because of reflection by a wall or the like. Moreover, compared with known techniques, such as mechanically aligning the plane of polarization of the transmission beam and that of the locally oscillated beam while monitoring a beat signal or the like, or dividing the plane of polarization of the transmission signal beam so that each of the divided plane can be mixed with a locally oscillated beam having a corresponding plane of polarization, this method provides a highly stable spatial optical transmission and allows the device to be more compact.

Especially, since the transmission beam is caused to be a circularly polarized beam, the plane of polarization of input components is unlikely to be greatly disturbed, which assures a stable transmission. The change of the plane of polarization is attributed to the spatial relationship between the optical transmitting device and the optical receiving device rather than the reflection by a wall or the like. In addition, since the plane of polarization is selected when mixing the transmission beam and the locally oscillated beam, the position detecting signal, which does not depend on the plane of polarization, is input to the multi-divided detector without loss. This ensures that the positional alignment is precisely controlled.

In the present example, a quarter-wave plate is inserted within the transmitting device. Alternatively, this plate may be inserted in the end face of the optical waveguide path device of the receiving device, on which the signal beam is incident. The means for causing the plane of polarization of the transmission beam components to be a circularly polarized beam, described with respect to the present example, may be applied also to the above-mentioned other examples.

Each of the above-mentioned examples may include the following configuration. The spatial optical transmission apparatus of the invention includes, a light signal transmitting device for outputting a signal beam, and a signal demodulating device for receiving and demodulating the signal beam from the light signal transmitting device. The signal demodulating device includes an optical system for collecting and separating the signal beam into two parts, a multi-divided photodetective section for receiving one part of the signal beam collected and separated by the optical system, a waveguide path section for guiding the other part of the signal beam collected and separated by the optical system to a predetermined position, a light signal detecting section for receiving a beam obtained by mixing the other part of the signal beam from the waveguide path section and a locally oscillated beam, and a control section for controlling movement of at least the optical system so that a central portion of the detection area of the multi-divided photodetective section is irradiated with the collected signal beam and, by using position detecting signal components obtained from the light signal received by the light signal detecting section, so that a wavefront of the signal beam and that of the locally oscillated beam are aligned.

The control section of the spatial optical transmission apparatus controls movement of at least the optical system so that the detection signal is obtained in equal amount from each of photodetective areas of the multi-divided photodetective section. In this way, the wavefront alignment control can be easily performed.

Alternatively, in the spatial optical transmission apparatus including a light signal transmitting device for outputting a signal beam, and a signal demodulating device for receiving and demodulating the signal beam from the light signal transmitting device. The signal demodulating device includes an optical system for collecting and separating the signal beam, a first multi-divided photodetective section for receiving one part of the signal beam collected and separated into two parts by the optical system, a second multi-divided photodetective section for receiving the other part of the signal beam collected and separated by the optical system so that the spot radius thereof is larger than that of the signal beam formed on the first multi-divided photodetective section, a waveguide path section for guiding the other part of the signal beam collected and separated by the optical system to a predetermined position, a light signal detecting section for receiving a beam obtained by mixing the other part of the signal beam from the waveguide path section and a locally oscillated beam, and a control section for controlling movement of at least the optical system so that the spot radius of the signal beam is formed in equal size on each of photodetective areas of the second multi-divided photodetective section, and then controlling the movement of at least the optical system so that a central portion of the first multi-divided photodetective section is irradiated with the signal beam, and further, by using position detecting signal components obtained from the light signal received by the light signal detecting section, so that a wavefront of the signal beam and that of the locally oscillated beam are aligned.

Thus, first, the control section controls movement of the optical system for performing the wavefront alignment based on a detection signal obtained from the second multidivided photodetective section with a larger irradiation spot radius, and then, controls movement of the optical system for performing the wavefront alignment more precisely based on a light receiving signal obtained from the first multi-divided photodetective section with a smaller irradiation spot radius. Thus, the angle permitting the wavefront alignment function is larger, and controllability of the wavefront alignment improves.

Furthermore, by adopting the waveguide path, a heterodyne optical system can be easily structured in the free space by using optical components. As a result, compared with the conventional system in which this optical part is movable, a more precise optical system for wavefront alignment or the like is obtained because in the thus configured heterodyne optical system the beam can be guided to a stable and non-movable optical section.

Preferably, an optical fiber is used as the waveguide path, whereby the beam can be easily and economically guided to a predetermined position.

More preferably, the optical fiber and the first multi-divided photodetective section of the spatial optical transmission apparatus are integrated into one unit by disposing one end face of the optical fiber in a part of the first multi-divided photodetective section. The optical part of the signal demodulating device can be small-sized and further stabilized, by thus integrating the first multi-divided photodetective section and the optical fiber.

More preferably, the collective lens of the optical system is disposed on the surface of one side of the glass substrate, the optical fiber is provided in the glass substrate so that an incidence end face thereof is located at the focal point of the collective lens, and a plurality of photodetectors are disposed in the vicinity of the collective lens on the surface of one side of the glass substrate, whereby the optical fiber, the first multi-divided photodetective section and the collective lens of the optical system are integrated into one unit. This integrated structure reduces the amount of positioning operation and the number of optical components, and allows the optical system to be stabilized.

The method for fabricating the spatial optical transmission apparatus of the present invention includes the steps of: forming an optical waveguide path layer on a substrate; forming a mirror section inclined at 45° on the substrate, whereby the incident transmission signal beam from the light signal transmitting device is reflected to an optical waveguide path in the optical waveguide path layer; forming a collective lens and an optical multiplexer of the optical system in the course of the waveguide path; forming a locally oscillated beam light source on the substrate so that the reflected beam and the locally oscillated beam are mixed by the optical multiplexer; forming a signal beam receiving section for receiving the mixed beam from the output end on the output end of the optical waveguide path; and forming in the vicinity of the mirror section a photodetective section by a plurality of photodetectors for receiving the transmission signal beam incident on the face of the substrate.

Thus, the mirror section, the waveguide path, the collective lens, the optical multiplexer, the signal beam receiving section, the locally oscillated beam light source and the plurality of photodetectors are formed on the same substrate, and they can be easily and fully integrated. This assures a stable optical system without influence of disturbance when the wavefront alignment is performed.

Furthermore, according to the present invention, the method for fabricating the spatial optical transmission apparatus includes the steps of: forming an optical waveguide path layer and a clad layer on the substrate; forming a grating section on a part of the surface of the optical waveguide path layer; opening an incidence window through which the transmission signal beam from the light signal transmitting device is incident, in the upper clad layer above the grating section, forming a plurality of photodetectors for receiving the transmission signal beam, in the vicinity of the incidence window above the clad layer, forming an optical multiplexer and a collective lens in the course of the optical waveguide path; forming a locally oscillated beam light source on the substrate for mixing the signal beam incident onto the optical waveguide path layer via the grating section and the locally oscillated beam by the optical multiplexer, and forming a signal beam receiving section for receiving the mixed beam from the output end on the output end of the optical waveguide path, and thereby fabricating an optical detection section. Thus, by forming the waveguide path layer, the clad layer, the grating section and the incidence window on the substrate, the structure which does not require the collective lens for collecting the beam to the optical waveguide path can be easily fabricated.

Furthermore, according to the present invention, the method for fabricating the spatial optical transmission apparatus includes the steps of: forming a Y-shaped waveguide path section on the substrate; forming on the substrate a mirror section inclined at 45 degrees for reflecting the incident transmission signal beam from the light signal transmitting device to be incident on one input portion of the Y-shaped optical waveguide path layer; forming a locally oscillated beam light source on the substrate for outputting the locally oscillated beam to be output to the other input portion of the Y-shaped optical waveguide path layer; forming a signal beam receiving section for receiving the mixed beam from the output end by the output end of the Y-shaped optical waveguide path; and fabricating in the vicinity of the mirror section an optical detection section by forming a plurality of photodetectors for receiving the transmission signal beam incident onto the face of the substrate at right angle. Thus, the above-mentioned integrated structure waveguide path may be replaced with the Y-shaped waveguide path, which eliminates necessity of forming the collective lens, the optical multiplexer or the like partially to be buried in the substrate and contributes to simplification of the fabrication process.

More preferably, in the method for fabricating the spatial optical transmission apparatus, the locally oscillated beam light source and the photodetector may be affixed on the substrate, or formed on the substrate by using a selective growth method. The locally oscillated beam light source and the photodetector can be integrated by being affixed to the substrate. In addition, the positional accuracy improves by thus forming the locally oscillated beam light source and the photodetector on the substrate by using a selective growth method.

Furthermore, the spatial optical transmission apparatus of the invention, which includes a light signal transmitting device for outputting a signal beam, and a signal demodulating device for receiving and demodulating the signal beam from the light signal transmitting device. The signal demodulating device includes: a detector irradiated with a beam spot of a signal beam from the signal transmitting device, for dividing a photoelectric current occurring at the beam spot inversely proportional to distances to the respective electrodes and taking the divided photoelectric current from the electrodes; a calculating section for calculating the position of the beam spot with which the detector is irradiated, based on each of the divided photoelectric currents taken out by the detector; and a control section for controlling, based on the result of calculation by the calculating section, movement of the detector so that the beam spot of the signal beam from the signal transmitting device is formed on the center of the detector and the signal beam is incident onto the detector at a right angle and thereby performing the wavefront alignment. Thus, rough detection of the direction in which the beam is incident can be performed quickly and accurately, which results in a speedy wavefront alignment operation.

The configurations and effects of the present invention will be summarized hereinafter.

(1) The alignment between the wavefront of the transmission beam and that of the locally oscillated beam is performed so that the direction of the locally oscillated beam and that of the transmission beam have a predetermined relationship, in such a manner that the intensity-modulated components of an output signal from the detector fall within a predetermined range. Accordingly, without using a conventional wavefront alignment technique using diffusion of the locally oscillated beam, the locally oscillated beam can be made to have a small spot size. Thus, the intensity of the locally oscillated beam can be prevented from being weak, and a high S/N ratio can be obtained. This ensures a high-speed transmission speed which is characteristic of the spatial optical transmission using coherency of a beam. In addition, since the light signal beam transmitting device can be arranged to have only a signal beam light source, which results in a simply configured apparatus operable at a lower energy consumption.

(2) The signal transmitting device included in the spatial optical transmission apparatus has a signal beam generating device. The output from the signal beam generating device is modulated in accordance with a transmission signal, and at the same time, a signal whose light intensity is modulated as a position detecting signal is output from the same light source into the air. Then, the position detecting signal is detected from a detector provided in the signal demodulating device. The wavefront alignment between the signal beam and the locally oscillated beam is performed by a means for moving the signal detector so that the position detecting signal has a desired value. Thus, compared with a conventional coherent spatial optical transmission apparatus using a diffused locally oscillated beam, the S/N ratio can be greatly improved and assures a high-speed digital spatial optical transmission. In addition, the signal transmitting device and the signal demodulating device can be less expensive, smaller-sized and operable at a lower energy consumption.

(3) The modulating element performs either frequency modulation or phase modulation. Accordingly, the signal can be reliably and easily modulated.

(4) The transmission beam is modulated in accordance with the transmission signal and intensity-modulated at a lower frequency compared with the signal transmission speed. This can be performed by only one light source, and thus the apparatus can be smaller-sized and operable at a lower energy consumption. Furthermore, the wavefront alignment between the transmission beam and the locally oscillated beam is controlled by adjusting so that intensity-modulated components of an output signal of the detector are in a predetermined range and that the direction of the locally oscillated beam and the direction of the transmission beam have a predetermined relationship and then extracting signal components. Thus, the wavefront alignment is correctly and quickly achieved, so that the signal components are extracted. In this way, the wavefront alignment is enabled by making the locally oscillated beam to have a smaller spot size, without using a conventional wavefront alignment method using diffusion of the locally oscillated beam. Accordingly, the intensity of the locally oscillated beam is prevented from being weak, and a higher S/N ratio can be obtained. Furthermore, since the modulation of the transmission signal is either frequency modulation or phase modulation, the signal can be reliably and easily modulated.

(5) Since at least the optical system is controlled to be moved so that the central portion of the detection areas of the multi-divided photodetective section is irradiated with the collected signal beam, the wavefront alignment for the signal beam propagated in the air and incident at a larger solid angle can be performed quickly and efficiently.

(6) The wavefront alignment for the signal beam propagated in the air and incident at a larger solid angle can be performed quickly and efficiently by controlling movement of at least the optical system so that the central portion of the detection areas of the multi-divided photodetective section is irradiated with the collected signal beam. Furthermore, compared with the positioning based on only the output from the multi-divided photodetective section, the efficiency of precise coupling between the incident beam and the waveguide path can be improved by controlling movement of at least the optical system so that the position detecting signal components obtained from the light signal received by the light signal detection section becomes maximum. Moreover, by using a waveguide path, a heterodyne optical system can be easily structured in free space by using optical components. As a result, compared with the conventional system in which the optical part is movable, a more precise optical system for wavefront alignment or the like is obtained, because the beam can be guided to the stable and nonmovable optical part. In addition, the signal beam is modulated in accordance with the transmission signal and intensity-modulated at a lower frequency compared with the signal transmission speed. This can be performed by using one light source, and thus the apparatus can be smaller-sized and operable at a lower energy consumption.

(7) In performing the wavefront alignment, first, the control section controls movement of the optical system based on a detection signal obtained from the second multi-divided photodetective section with a large irradiation spot radius, and then, controls movement of the optical system for performing the wavefront alignment more precisely based on a light detection signal obtained from the first multi-divided photodetective section with a small irradiation spot radius. Thus, the angle permitting the wavefront alignment function is larger, and controllability of the wavefront alignment improves. In addition, by using a waveguide path, a heterodyne optical system or the like can be easily structured in free space by using optical components. As a result, compared with the conventional system in which the optical part is movable, a more precise optical system for wavefront alignment or the like is obtained, because the beam can be guided to the stable and non-movable optical part.

(8) Moreover, the mirror section, the plurality of photodetectors, the waveguide path section, the signal beam receiving section, the collective lens, the optical multiplexer, and the locally oscillated beam light source may be configured on the same substrate so as to be integrated as one unit. This configuration enables a stable optical system which is not affected by disturbance when performing the wavefront alignment.

(9) Furthermore, by providing a grating section in addition to the integrated system, the system can dispense with the collective lens for the waveguide path and the operation for positioning the lens. This allows the optical system to be smaller-sized and more simply assembled. In addition, the above-mentioned integrated wave guide path may be replaced with a Y-shaped waveguide path. Then, there is no need to form the collective lens or the optical multiplexer to be partially buried in the substrate. Thus, the number of components of the apparatus can be reduced, and the fabricating process may be simplified.

In the case where the beam is output as a linearly polarized beam for performing the optical heterodyne detection, it is required not only to tune the oscillation wavelength but also align the plane of polarization. However, in the present invention, since the necessity of alignment of the plane of polarization is eliminated because of a member whereby the plane of polarization of the transmission signal beam components transmitted to the light signal demodulating device is caused to be a circularly polarized beam, the light signal demodulating device may have a simple configuration which enables the signal to be received more quickly. In addition, a stable signal detection is always ensured, even if the plane of polarization is changed because of reflection by a wall or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A spatial optical transmission apparatus comprising:
   a light signal transmitting means for generating a transmission signal beam modulated with an information signal to be transmitted and intensity-modulated with a position detection signal, where the position detection signal has a lower frequency than a transmission speed of the information signal; and
   a light signal demodulator including:
      a detector for receiving the transmission signal beam from the light signal transmitting means,
      a spatially adjustable detector housing means for adjusting the detector with respect to the received transmission signal beam,
      a local oscillator means generating a locally oscillated beam that is mixed with the received transmission signal beam,
      a processing circuit means for extracting the intensity modulated position detection signal from the received transmission signal beam output from the detector,
      a control circuit for spatially positioning the detector housing to adjust the orientation of the detector with respect to the received transmission signal beam so that the intensity-modulated position detection signal output from the detector is within a predetermined range of intensity, thereby aligning a wavefront of the received transmission signal beam with a wavefront of the locally oscillated beam being mixed with the received signal beam, and
      a signal demodulation circuit means for extracting the information signal from the transmission signal beam.

2. A spatial optical transmission apparatus according to claim 1, wherein the light signal transmitting means performs at least one of a frequency modulation and a phase modulation.

3. A spatial optical transmission apparatus comprising:
   a light signal transmitting means including:
      an optical modulating means for outputting to a signal beam generating means a light information signal modulated in accordance with an information signal to be transmitted;
      a light intensity modulating means for outputting to the light signal beam generating means a position detection signal whose signal intensity periodically changes;
      the signal beam generating means generating an oscillating transmission signal beam of coherent light having a light frequency modulated by said light information signal input from said optical modulating means and a light intensity modulated by said position detection signal input from said light intensity modulating means, and
      a light transmission means for transmitting the transmission signal beam; and
   a light signal demodulating means for receiving the transmission signal beam which includes:
      a light receiving element for receiving the transmission signal beam;
      a local oscillator means for generating a locally oscillated beam coherent with the signal beam;
      an optical multiplexer means for mixing the transmission signal beam and the locally oscillated beam;
      a photoelectric converting means for photoelectrically converting to an electrical signal the transmission signal beam mixed by the optical multiplexer means;
      a high frequency band pass means for passing high frequency band components of the electrical signal input from the photoelectric converting means;
      a transmission signal demodulating means for demodulating the information signal output from the high frequency band pass means;
      a low frequency band pass means for passing low frequency band components of the electrical signal input from the photoelectric converting means,
      a processing means for extracting the position detection signal from the low frequency band components; and
      a scanning drive means for spatially scanning the photoelectric converting means in accordance with the position detection signal extracted by the processing; means.

4. A spatial optical transmission apparatus according to claim 3, wherein the optical modulating means performs at least one of a frequency modulation and a phase modulation.

5. A spatial optical transmission method using a light signal transmitter and a light signal receiver having a spatially adjustable detector, a processing circuit, a local oscillator and a signal demodulator circuit, said method comprising the steps of:
   generating in the light signal transmitter a coherent transmission beam that is frequency-modulated with a transmission data signal and intensity-modulated with a position detection signal, where the position detection signal has a lower frequency than does a signal transmission speed of the transmission data signal;
   transmitting the transmission beam from the light signal transmitter to the light signal receiver;
   receiving the transmission beam by the detector of the light signal receiver;
   extracting with the processing circuit the position detection signal from the received transmission beam and sensing the intensity of the extracted position detection signal;
   aligning the detector with respect to the received transmission beam so that the intensity of the extracted position detection signal is within a predetermined intensity range, thereby aligning a wavefront of the signal beam and a wavefront of the locally oscillated beam with each other; and
   extracting with the signal demodulation circuit the the transmission data signal from the received transmission beam.

6. A spatial optical transmission method using a light signal transmitter and a light signal receiver having a spatially adjustable detector, a processing circuit, a local oscillator and a signal demodulator circuit, said method comprising the steps of:
   generating a coherent light transmission beam in the light signal transmitter by phase modulating a transmission data signal to the transmission beam, and intensity-modulating a position detection signal, where the position detection signal has a lower frequency than does a signal transmission speed of the transmission data signal;
   transmitting the light transmission beam from the light signal transmitter to the light signal receiver;

receiving the transmission beam by the detector of the light signal receiver;

extracting with the processing circuit the position detection signal from the received transmission beam and sensing the intensity of the extracted position detection signal;

aligning the detector with respect to a direction of the received transmission beam so that the intensity of the extracted position detection signal is within a predetermined intensity range, thereby aligning a wavefront of the signal beam and a wavefront of the locally oscillated beam with each other: and extracting with the signal demodulation circuit the the transmission data signal from the received transmission beam.

7. A spatial optical transmission apparatus comprising:

a light signal transmitting means for generating and transmitting a transmission signal beam modulated with an information signal to be transmitted and intensity-modulated with a position detection signal having a lower frequency than a transmission speed of the information signal; and a light signal demodulating means for receiving and demodulating the transmission signal beam from the light signal transmitting means, the light signal demodulating means including:

a movable optical system means for collecting and separating the transmission signal beam into two parts, each of which contains components corresponding to the information signal and components corresponding to the position detection signal;

a divided photodetective sensor for receiving one of the two parts of the transmission signal beam and detecting the position detection signal components contained therein; and a control section for controlling movement of the optical system to align a center area of the divided photodetective sensor with the transmission signal beam.

8. A spatial optical transmission apparatus comprising:

a light signal transmitting means for generating and transmitting a transmission signal beam modulated with an information signal to be transmitted and intensity-modulated with a position detection signal, where said position detection signal has a lower frequency than a signal transmission speed of the information signal; and a light signal demodulating means for receiving and demodulating the transmission signal beam from the light signal transmitting means, the light signal demodulating means includes:

an optical system for collecting and separating the transmission signal beam into a first part and a second part, each containing components of the information signal and the position detection signal;

a divided photodetector for receiving the first part of the separated transmission signal beam and detecting the position detection signal components contained therein;

a waveguide for guiding the second part of the separated transmission signal beam to a demodulation circuit;

a light signal detecting section for receiving a mixed light signal obtained by mixing the second part of the separated transmission signal beam and a locally oscillated beam; and a control section for controlling movement of the optical system to position a central portion of a detection area of the divided photodetector to be irradiated with the transmission signal beam in accordance with the detected position detection signal components, so that a wavefront of the transmission signal beam and a wavefront of the locally oscillated beam are aligned.

9. A spatial optical transmission apparatus comprising:

a light signal transmitting means for outputting a transmission signal beam;

a light signal demodulating means for receiving the transmission signal beam from the light signal transmitting means, the light signal demodulating means includes:

an optical system for collecting and separating the transmission signal beam into first and second beams;

a first divided photodetector means for receiving the first beam, wherein the first beam forms an irradiated spot on the first photodetector means having a first spot radius;

a second divided photodetector means for receiving the second beam, wherein the second beam forms an irradiated spot on the second photodetector means having a second spot radius;

a control section means for moving the optical system to adjust the irradiated spot from the second beam so that the second spot radius is larger than the first spot radius, and said control section means for later controlling the movement of the optical system to irradiate with the first signal beam a central portion of a detection area of the first divided photodetective means.

\* \* \* \* \*